United States Patent
DeWeert et al.

(10) Patent No.: US 10,643,313 B2
(45) Date of Patent: May 5, 2020

(54) METHODS FOR IMAGE DENOISING AND DEBLURRING

(71) Applicant: BAE SYSTEMS INFORMATION AND ELECTRONIC SYSTEMS INTEGRATION INC., Nashua, NH (US)

(72) Inventors: Michael J. DeWeert, Kailua, HI (US); Ian B. Murray, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 185 days.

(21) Appl. No.: 15/875,327

(22) Filed: Jan. 19, 2018

(65) Prior Publication Data

US 2019/0228506 A1    Jul. 25, 2019

(51) Int. Cl.
*G06T 5/00* (2006.01)
*G06T 5/50* (2006.01)
(Continued)

(52) U.S. Cl.
CPC ............. *G06T 5/003* (2013.01); *G06T 5/50* (2013.01); *G06T 7/13* (2017.01); *G06T 7/168* (2017.01);
(Continued)

(58) Field of Classification Search
CPC .. G06T 5/003; G06T 5/50; G06T 7/13; G06T 7/168; G06T 2207/10048; G06T 2207/20032; G06T 2207/20056
See application file for complete search history.

(56) References Cited

U.S. PATENT DOCUMENTS

| 8,508,606 B2 * | 8/2013 | Liu | G06T 5/003 348/208.4 |
| 9,390,486 B2 * | 7/2016 | Khurana | G06T 5/50 |

(Continued)

FOREIGN PATENT DOCUMENTS

WO    2014132830 A1    9/2014

OTHER PUBLICATIONS

Morgenshtern et al. "Super Resolution of Positive Sources: the Discrete Setup" Research Gate—Dec. 2014 (Dec. 14), pp. 1-31.*
(Continued)

*Primary Examiner* — Mia M Thomas
(74) *Attorney, Agent, or Firm* — Sand, Sebolt & Wernow LPA; Scott J. Asmus

(57) ABSTRACT

Systems and methods related to pre-processing images and estimating PSFs for image deblurring in a noise-robust manner. The pre-processing may include iteratively denoising a reference image, iteratively denoising a scene image containing at least one straight edge within the scene image while preserving the at least one straight edge. The pre-processing may include smoothing, subtracting and dividing to provide a pre-processed image. The PSF-estimation process may include generating, with the at least one processor, a first noise value from portions of an edge intensity profile, generating a second noise value from a difference between the edge intensity profile and an integral of the noise-regularized inversion of the integration operator operating on the edge intensity profile and determining a value of a local curvature regularization parameter resulting in the first noise value and the second noise value being within a tolerance range.

19 Claims, 17 Drawing Sheets

(51) Int. Cl.
*G06T 7/13* (2017.01)
*G06T 7/168* (2017.01)

(52) U.S. Cl.
CPC ............ *G06T 2207/10048* (2013.01); *G06T 2207/20032* (2013.01); *G06T 2207/20056* (2013.01)

(56) References Cited

U.S. PATENT DOCUMENTS

| | | | | |
|---|---|---|---|---|
| 10,178,381 | B2* | 1/2019 | Hall | H04N 17/002 |
| 2003/0156758 | A1* | 8/2003 | Bromiley | G06T 5/50 |
| | | | | 382/219 |
| 2005/0189491 | A1* | 9/2005 | Lewis | B82Y 15/00 |
| | | | | 250/310 |
| 2005/0276513 | A1* | 12/2005 | Ojanen | G06T 7/0002 |
| | | | | 382/286 |
| 2007/0286517 | A1* | 12/2007 | Paik | H04N 5/23212 |
| | | | | 382/255 |
| 2008/0240607 | A1* | 10/2008 | Sun | G06T 5/50 |
| | | | | 382/275 |
| 2010/0080487 | A1* | 4/2010 | Yitzhaky | G06T 5/003 |
| | | | | 382/266 |
| 2011/0164799 | A1* | 7/2011 | Miao | G06T 11/006 |
| | | | | 382/131 |
| 2012/0170862 | A1* | 7/2012 | Park | G06K 9/40 |
| | | | | 382/255 |
| 2014/0093238 | A1* | 4/2014 | Roberts | H04B 10/116 |
| | | | | 398/43 |
| 2014/0119628 | A1* | 5/2014 | Elad | G06T 11/006 |
| | | | | 382/131 |
| 2015/0036943 | A1* | 2/2015 | Lin | G06T 5/003 |
| | | | | 382/264 |
| 2015/0086126 | A1* | 3/2015 | Senzaki | G06T 5/002 |
| | | | | 382/263 |
| 2015/0348248 | A1* | 12/2015 | Shibata | G06T 5/003 |
| | | | | 382/260 |
| 2016/0048952 | A1* | 2/2016 | Tezaur | G06T 5/004 |
| | | | | 382/255 |
| 2017/0032535 | A1* | 2/2017 | Harding | A61B 6/5211 |
| 2017/0039706 | A1* | 2/2017 | Mikhno | A61B 6/037 |
| 2017/0069082 | A1* | 3/2017 | Mailhe | G06T 5/002 |
| 2017/0191945 | A1* | 7/2017 | Zhang | G01N 21/8851 |
| 2017/0311918 | A1* | 11/2017 | Qi | A61B 6/032 |
| 2018/0115704 | A1* | 4/2018 | Kim | G06T 3/4053 |
| 2018/0343432 | A1* | 11/2018 | Duan | G01S 7/497 |

OTHER PUBLICATIONS

International Search Report, PCT/US19/13900, dated Apr. 30, 2019, 9 pages.

Levenberg, K. "A Method for the Solution of Certain Non-Linear Problems in Least-Squares," Quarterly Applied Mathematics 2, Feb. 21, 1944, pp. 164-168.

Marquardt, A "An Algorithm for Least-Squares Estimation of Nonlinear Parameters," SIAM Journal of the Society for Industrial and Applied Mathematics, Jun. 1963, pp. 431-441, vol. 11, No. 2.

Tikhonov, A. N., "Solutions of Ill-posed Problems," Washington: Winston & Sons, 1977, 4 pages, ISBN 0-470-99124-0, xiii.

Canny, J., "A Computational Approach to Edge Detection," IEEE Transactions on Pattern Analysis and Machine Intelligence, Nov. 1986, pp. 679-698, vol. PAMI-8, No. 6.

ISO 12233, "Resolution and spatial frequency responses," International Organization for Standardization (ISO), 2000, 9 pages, http://www.imatest.com/solutions/iso-12233/.

Chartrand, "Numerical Differentiation of Noisy, Nonsmooth Data", International Scholarly Research Network, ISRN Applied Mathematics, Dec. 13, 2005, 11 pages, vol. 2011, Article ID 164564, Los Alamos National Laboratory.

Sobel, "History and Definition of the so-called Sobel Operator," ResearchGate, Feb. 2, 2014, 6 pages.

ISO 12233, "Electronic Still-Picture Cameras—Resolution Measurements," International Organization for Standardization (ISO), 2000, 11 pages.

ISO 12233, "Photography—Electronic Still Picture Imaging—Resolution and Spatial Frequency Responses," International Organization for Standardization (ISO), 2014, 2 pages.

\* cited by examiner

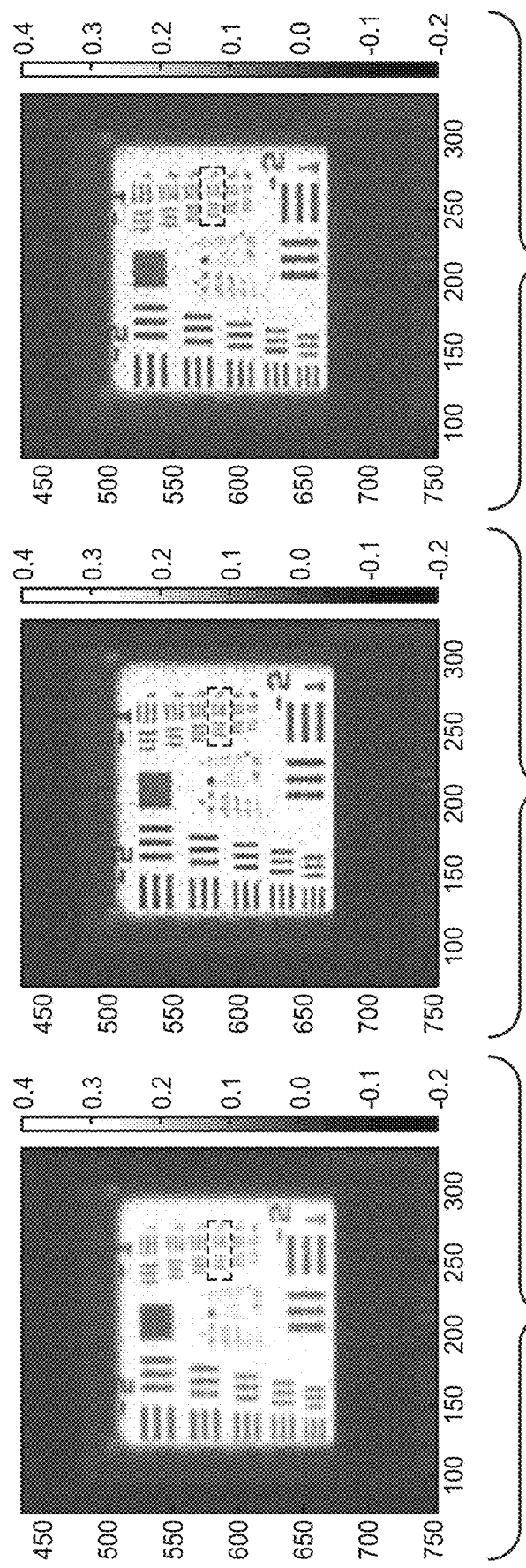

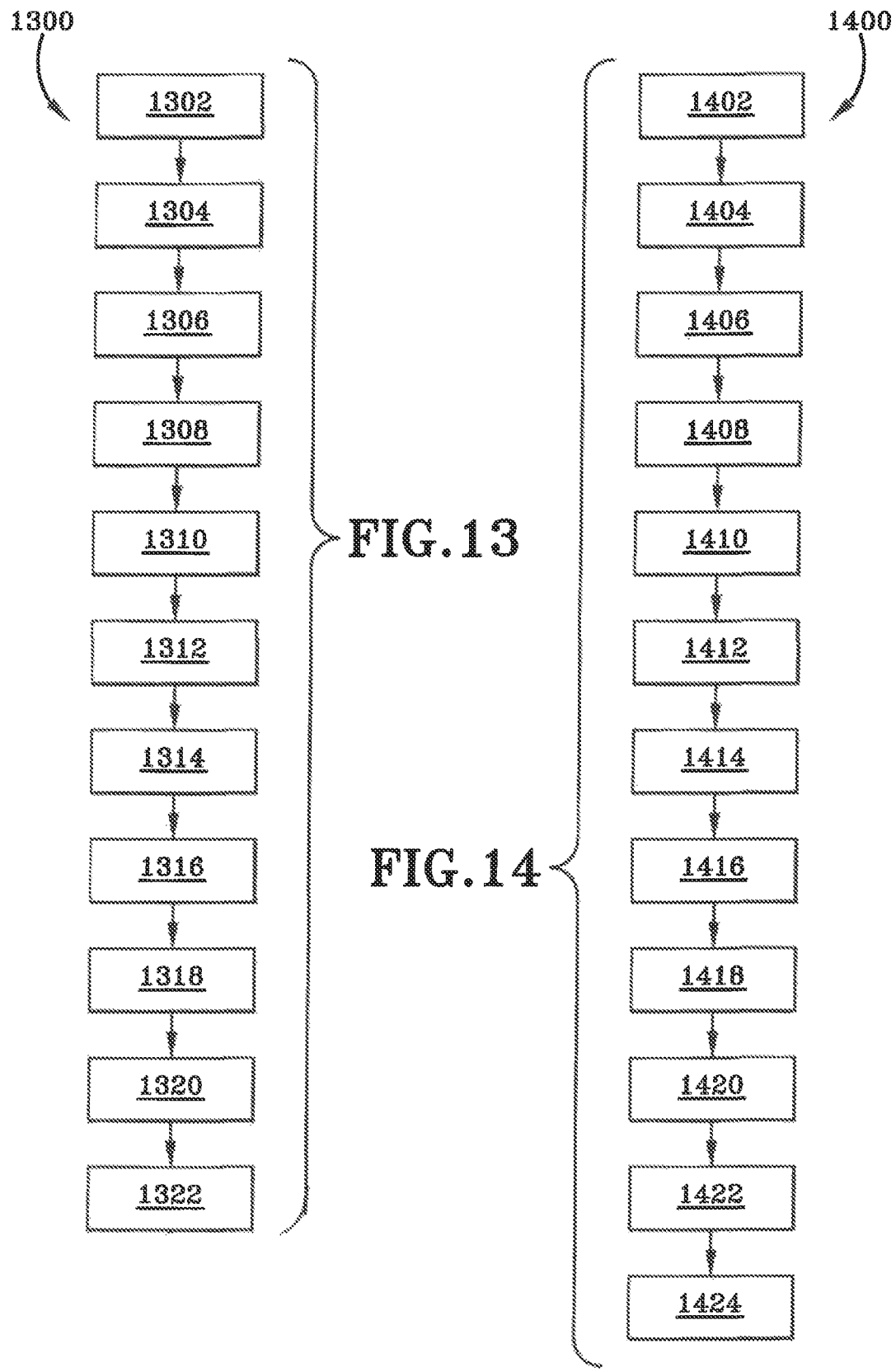

METHODS FOR IMAGE DENOISING AND DEBLURRING

BACKGROUND

Technical Field

The present disclosure relates to systems and methods for image deblurring. More particularly, the present disclosure relates to pre-processing images and estimating point spread functions (PSFs) for image deblurring. Specifically, the present disclosure relates to pre-processing images and estimating PSFs for image deblurring in a noise-robust manner.

Background Information

Generally, images acquired by an optical system, such as an imaging system, typically exhibit image degradations that reduce image quality. Sources of image degradation may include, inter alia, image blur and noise.

Generally, there are multiple sources of image blur, including, but not limited to, the optics of the imaging system used to acquire the images as well as environmental effects, such as atmospheric multiple scattering. Characterizing and removing image blur and noise from the image may render clearer images and improve the usability of the imaging system.

One exemplary method for characterizing image blur utilizes bright point-like sources operated at temperatures relevant to real-world applications to measure a point spread function (PSF). Generally, a PSF represents the impulse response of an imaging system to a point source. Therefore, an image of a point-like source may be a direct measurement of the PSF of an imaging system. However, utilizing point-like sources may not be suitable for all applications.

For example, utilizing bright point-like sources for deblurring long wavelength infrared (LWIR) images may not be suitable, especially for uncooled LWIR imaging systems, because the point-like sources typically need to be bright enough to create high contrast relative to the noisy background which requires either making the point-like source large (i.e. no longer a point source), or impractically hot.

SUMMARY

There remains a need in the art for an improved system and method for image deblurring. The present disclosure relates to pre-processing images and estimating PSFs for image deblurring in a noise-robust manner.

In one aspect, the present disclosure may provide a method for deblurring an image comprising acquiring at least one reference image from an imaging system and acquiring at least one scene image from the imaging system. The method may further include detecting at least one straight edge contained in the at least one scene image, averaging the at least one reference image to provide an averaged reference image and averaging the at least one scene image to provide an averaged scene image. The method may further include iteratively denoising the averaged reference image and iteratively denoising the averaged scene image; wherein the at least one straight edge is preserved. The method may further include low-pass filtering the averaged reduced-noise reference image to provide a low-pass filtered averaged reduced-noise reference image, subtracting the averaged reduced-noise reference image from the averaged reduced-noise scene image to provide a difference image and dividing, element by element, the difference image by the low-pass filtered averaged reduced-noise reference image to provide a pre-processed image. The method may further include estimating a point spread function (PSF) from the at least one straight edge of the pre-processed image and deblurring the pre-processed image based on the estimated PSF.

In one example, the at least one straight edge contained in the at least one scene image may be slanted relative to a focal plane of the imaging system. In another example, the step of detecting at least one straight edge contained in the at least one scene image may be accomplished by transforming at least one curved edge into the at least one straight edge.

In one example the estimated PSF may represent an estimated PSF of the imaging system. In another example, the estimated PSF may represent an estimated PSF of the imaging system and a scattering medium.

The steps of iteratively denoising the averaged reference image and the iteratively denoising the averaged scene image may further comprise identifying bad pixels in the reference image and replacing the bad pixels in the reference image with median-filtered values. Identifying bad pixels in the reference image and replacing bad pixels in the reference image with the median-filtered values may be iterated until a number of remaining bad pixels is within a tolerance value.

The steps of iteratively denoising the averaged scene image and iteratively denoising the averaged scene image may further comprise identifying bad pixels in the scene image and replacing the bad pixels in the scene image with median-filtered values. Identifying bad pixels in the scene image and replacing bad pixels in the scene image with median-filtered values may be iterated until a number of remaining bad pixels is within a tolerance value.

In one example, the step of estimating a point spread function (PSF) from the at least one straight edge of the pre-processed image may further comprise extracting a region of interest including columns enclosing the at least one straight edge, finding the at least one straight edge column by column by fitting each column to a sigmoid function and storing sigmoid centers versus a column index of the columns of the region of interest as an estimated sigmoid-fit output vector, fitting a line to the estimated sigmoid-fit output vector, sliding the columns of the region of interest to make a slope of the fitted line of the estimated sigmoid output vector zero, averaging the columns of the region of interest to compute an edge intensity profile, building leaky integration differentiation operators based on the edge intensity profile, setting a regularization parameter, generating at least one line spread function (LSF) via noise-regularized inversion of an integration operator operating on the edge intensity profile, generating a first noise value from portions of the edge intensity profile a distance from the at least one edge, generating a second noise value from a difference between the edge intensity profile and an integral of the noise-regularized inversion, determining a value of a local curvature regularization parameter resulting in the first noise value and the second noise value being within a tolerance range, generating the estimated PSF from the at least one LSF and deblurring the pre-processed image based on using the estimated PSF.

In another aspect, the present disclosure may provide a method for estimating a point spread function (PSF) comprising acquiring an image from an imaging system, detecting at least one straight edge contained in the image, extracting a region of interest including columns enclosing the at least one straight edge, finding the at least one straight edge column by column by fitting each column to a sigmoid function, storing sigmoid centers versus a column index of the columns of the region of interest as an estimated sigmoid-fit output vector, fitting a line to the estimated sigmoid-fit output vector, sliding the columns of the region of interest to make a slope of the fitted line of the estimated sigmoid output vector zero, averaging the columns of the region of interest to compute an edge intensity profile, building leaky integration differentiation operators based on the edge intensity profile, setting a regularization parameter, generating at least one line spread function (LSF) via noise-regularized inversion of an integration operator operating on the edge intensity profile, generating a first noise value from portions of the edge intensity profile a distance from the at least one edge, generating a second noise value from a difference between the edge intensity profile and an integral of the noise-regularized inversion, determining a value of a local curvature regularization parameter resulting in the first noise value and the second noise value being within a tolerance range and generating the estimated PSF from the at least one LSF.

In one example, the at least one straight edge contained in the image may be slanted relative to a focal plane of the imaging system. In another example, the step of detecting at least one straight edge contained in the image is accomplished by transforming at least one curved edge into the at least one straight edge.

In one example, the estimated PSF may represent an estimated PSF of the imaging system. In another example, the estimated PSF may represent an estimated PSF of the imaging system and a scattering medium.

The method may further include deblurring the image based on the estimated PSF. In one example, the step of deblurring the image based on the estimated PSF may be accomplished by Fourier transform (FT) deblur processing. In another example, the step of deblurring the image based on the estimated PSF may be accomplished by Compressive Imaging (CI) deblur processing.

In another aspect, the present disclosure may provide a method for pre-processing an image comprising iteratively denoising, with a processor, a reference image to create a reduced-noise reference image and iteratively denoising, with the at least one processor, a scene image containing at least one straight edge within the scene image to create a reduced-noise scene image where the at least one straight edge is preserved. The method may further include smoothing, with the at least one processor, the reduced-noise reference image to provide a smoothed reduced-noise reference image, subtracting, with the at least one processor, the reduced-noise reference image from the reduced-noise scene image to provide a difference image and dividing, with the at least one processor, the difference image by the smoothed reduced-noise reference image to provide a pre-processed image.

In one example, iteratively denoising the reference image may further include identifying, with the at least one processor, bad pixels in the reference image and replacing, with the at least one processor, bad pixels in the reference image with median-filtered values. The step of identifying bad pixels in the reference image and the replacing bad pixels in the reference image with the median-filtered values may be iterated until a number of remaining bad pixels is within a tolerance value.

In one example, iteratively denoising the scene image may further include identifying, with the at least one processor, bad pixels in the scene image and replacing, with the at least one processor, bad pixels in the scene image with median-filtered values. The step of identifying bad pixels in the scene image and replacing bad pixels in the scene image with median-filtered values may be iterated until a number of remaining bad pixels is within a tolerance value.

In another aspect, the present disclosure may provide a method for estimating a point spread function (PSF) comprising obtaining, with a processor, an edge intensity profile from at least one straight edge within an image, generating, with the at least one processor, at least one line spread function (LSF) via noise-regularized inversion of an integration operator operating on the edge intensity profile and generating, with the at least one processor, the estimated PSF from the at least one LSF.

The method may further include building, with the at least one processor, leaky integration differentiation operators and setting, with the at least one processor, a regularization parameter. The method may further include generating, with the at least one processor, a first noise value from portions of the edge intensity profile a distance from the at least one straight edge, generating, with the at least one processor, a second noise value from a difference between the edge intensity profile and an integral of the noise-regularized inversion of the integration operator operating on the edge intensity profile and determining, with the at least one processor, a value of a local curvature regularization parameter resulting in the first noise value and the second noise value being within a tolerance range.

In one example, the at least one straight edge contained within the image may be slanted relative to a focal plane of an imaging system. In another example, the at least one straight edge contained within the image may be transformed from at least one curved edge.

In one example, the estimated PSF may represent an estimated PSF of an imaging system. In another example, the estimated PSF may represent an estimated PSF of an imaging system and a scattering medium.

The method may further include deblurring, with the at least one processor, the image based on the estimated PSF. In one example, the deblurring the image based on the estimated PSF may be accomplished by noise-regularized Fourier transform (FT) deblur processing. In another example, the deblurring the image based on the estimated PSF may be accomplished by noise-regularized Compressive Imaging (CI) deblur processing.

In one example, generating the estimated PSF from the at least one LSF may further include fitting, with the at least one processor, a PSF model to the at least one LSF to generate the estimated PSF. In another example, generating the estimated PSF from the at least one LSF may further include taking, with the at least one processor, an outer product of the at least one LSF with the at least one LSF to generate the estimated PSF. In another example, generating the estimated PSF from the at least one LSF may further include rotating, with the at least one processor, the at least one LSF around a peak of the at least one LSF to generate the estimated PSF.

In one example, the image may be a long wavelength infrared (LWIR) image.

In another aspect, the present disclosure may provide systems and methods related to pre-processing images and estimating PSFs for image deblurring in a noise-robust manner. The pre-processing may include iteratively denoising a reference image, iteratively denoising a scene image containing at least one straight edge within the scene image while preserving the at least one straight edge. The pre-processing may include smoothing, subtracting and dividing to provide a pre-processed image. The estimating a PSF may include generating, with the at least one processor, a first noise value from portions of an edge intensity profile, generating a second noise value from a difference between the edge intensity profile and an integral of the noise-regularized inversion of the integration operator operating on the edge intensity profile and determining a value of a local curvature regularization parameter resulting in the first noise value and the second noise value being within a tolerance range.

BRIEF DESCRIPTION OF THE SEVERAL VIEWS OF THE DRAWINGS

Sample embodiments of the present disclosure are set forth in the following description, is shown in the drawings and is particularly and distinctly pointed out and set forth in the appended claims.

FIG. 11A is an LWIR input image;

FIG. 11B is an LWIR image showing the results of FT deblur processing;

FIG. 11C is an LWIR image showing the results of CI deblur processing;

FIG. 13 is a flow chart representing an exemplary method or process in accordance with the present disclosure; and FIG. 14 is a flow chart representing an exemplary method or process in accordance with the present disclosure.

Similar numbers refer to similar parts throughout the drawings.

DETAILED DESCRIPTION

Figure 1:
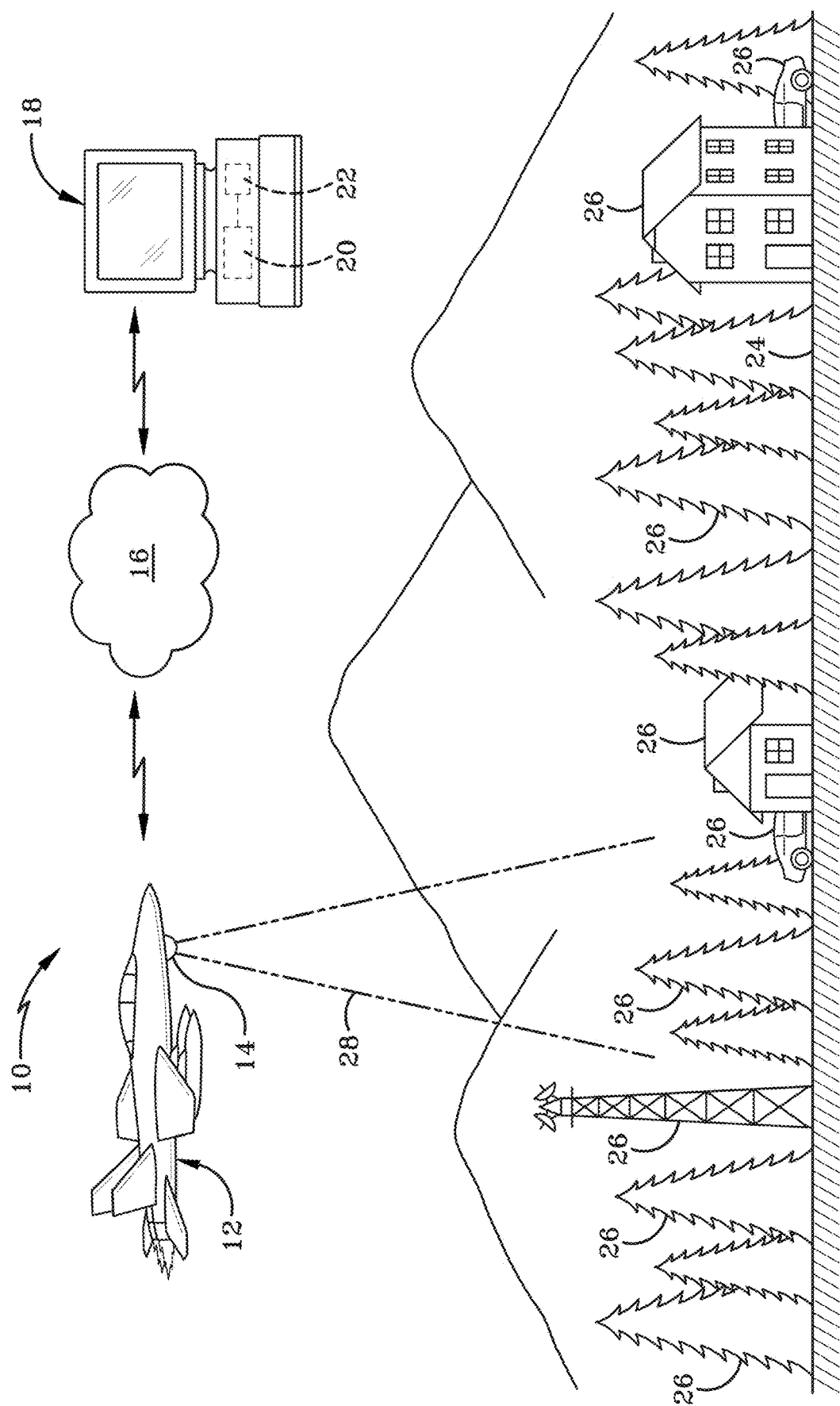
FIG. 1 depicts an exemplary system in accordance with the present disclosure for pre-processing images and estimating PSFs for image deblurring in a noise-robust manner.

FIG. 1 depicts an exemplary system in accordance with the present disclosure for pre-processing images and estimating PSFs for image deblurring in a noise-robust manner. More particularly, FIG. 1 depicts a diagrammatic environmental view of a system 10 comprising an airborne vehicle 12 carrying an infrared or other imaging system 14 in operative communication with a network 16, and a computer 18 having at least one non-transitory computer readable storage medium 20 and at least one processor 22. In one example a system has multi-core processors or general-purpose graphical processing units (GPGPUs) used for the image deblurring. In another example the image data is processed on more than a single system such that a partial processing is done on one or more processors and then subject to processing by one or more external processors. In one example, the imaging system 14 may include a collection of elements for collecting and redirecting radiated energy, (such as lenses, mirrors, optics, pinholes, or the like), together with supporting equipment, (such as power supplies, optical amplifiers or the like), and a recording or capturing mechanism for recording or capturing the collected radiated energy or radiated energetic particles as an image. In another example, the imaging system 14 may include a focal plane, a dewar, power and readout electronics, and may further include an imaging sensor after being combined with optics, a pointing system, and additional electronics of the imaging system 14. Although exemplary imaging systems 14 have been described, it is envisioned that the imaging system 14 may be any suitable imaging system including, but not limited to, imaging systems configured to capture imagery from distinct portions of the electromagnetic spectrum (e.g., visible, near-infrared, terahertz (THz), or any other suitable portion of the electromagnetic spectrum), or radiated particles (e.g. beta or alpha particles, or any other radiated particles), or non-electromagnetic radiated energy (e.g. acoustic or seismic) that may be used to form images. Additionally, a portion of the system 10 is configured to be positioned to view a scene 24 having a plurality of substances or objects 26, either natural or manmade, positioned therein. In accordance with one aspect of the present disclosure, the substances or objects 26 on the ground 24 are able to be detected by the system 10 by capturing imagery data from the imaging system 14. The scene 24 may be any suitable scene.

Airborne vehicle 12, which may also generally be referred to herein as a platform, may be at any suitable range from a scene 24. Furthermore, the platform does not need to be an airborne vehicle 12. The term platform may refer to any suitable carrying mechanism that is able to carry the imaging system 14. For example, and not meant as a limitation, the platform could be a spacecraft, a manned or unmanned aerial vehicle (UAV), a ground-based vehicle, an underwater vehicle, a medical endoscope, or a human operator.

Imaging system 14 carried by airborne vehicle 12 may be a thermal imaging system capable of capturing imagery data within a field of view 28. In one particular embodiment, imaging system 14 may be an infrared (IR) imaging system capturing long wavelength infrared (LWIR) images; however, imaging system 14 may be any suitable imaging system.

With continued reference to FIG. 1, the computer 18 is in operative communication with the network 16 in a known manner such as through fiber or free-space optics, wired or wireless internet, a secured wireless connection, or an acoustic data link. The network 16 establishes communication between imaging system 14 and the computer 18. The network 16 allows data captured by the imaging system 14 to transfer to the at least one processor 22 and is in communication with the at least one non-transitory computer readable storage medium 20. Additionally, the at least one non-transitory computer readable storage medium 20 has instructions encoded thereon, that when executed by the at least one processor 22, implement operations to pre-process images and estimate PSFs for image deblurring in a noise-robust manner.

In one particular embodiment, the system 10, and, more particularly, the instructions encoded on the at least one non-transitory computer readable storage medium 20 and the at least one processor 22, may be utilized to deblur LWIR images in a noise-robust manner; however, it is to be understood that the instructions encoded on the at least one non-transitory computer readable storage medium 20 and the at least one processor 22 may be utilized to deblur any suitable images.

Generally, LWIR imagery includes various sources of noise that may typically complicate image-blur estimation. Some sources of noise may be inherent in the detection process and may vary randomly from image to image, such as photon-counting, dark noise and pixel-read noise. Other sources of noise may persist from frame to frame, such as defective pixels and pixel-to-pixel gain variations. In order to achieve accurate PSF estimates, it is beneficial to suppress noise within the images. In order to reduce random photon-counting and pixel-read noise, an average of a multiplicity may be computed. In order to remove persistent noise, median filtering is typically utilized; however, applying a median filter to an entire image introduces additional image blur which negatively affects the image. As such, the system 10 and the instructions encoded on the at least one non-transitory computer readable storage medium 20 and the at least one processor 22 may pre-process images to remove noise and prepare the images for further image deblurring processing as described below.

In accordance with one aspect of the present disclosure, the system 10 may acquire at least one reference image. The reference image, which may also be referred to as a "flat," may be an image captured by the imaging system 14 with an aperture (not shown) of the camera covered by a uniform-temperature lens cap (not shown) or sphere (not shown), or facing any other suitable type of thermally uniform calibration target. The system 10 may acquire at least one scene image containing at least one edge 30 (FIG. 2B) from the imaging system 14. In one example, the at least one edge 30 may be a slanted straight edge and in another example the at least one edge 30 may be a curved edge. A straight edge may be defined as an edge which may be fitted by a two-parameter (e.g., slope and offset) line, to within a tolerance value. The tolerance value may be any suitable tolerance value. A slanted straight edge is a straight edge whose image crosses multiple row or column edges on an image plane of pixelated rows and columns. A curved edge may be defined as an edge which may be fit by a multiple-parameter analytic curve, such as a polynomial or spline. The number of parameters chosen for the fitting procedure may be a minimum number sufficient to follow the edge without overfitting.

Figure 2:
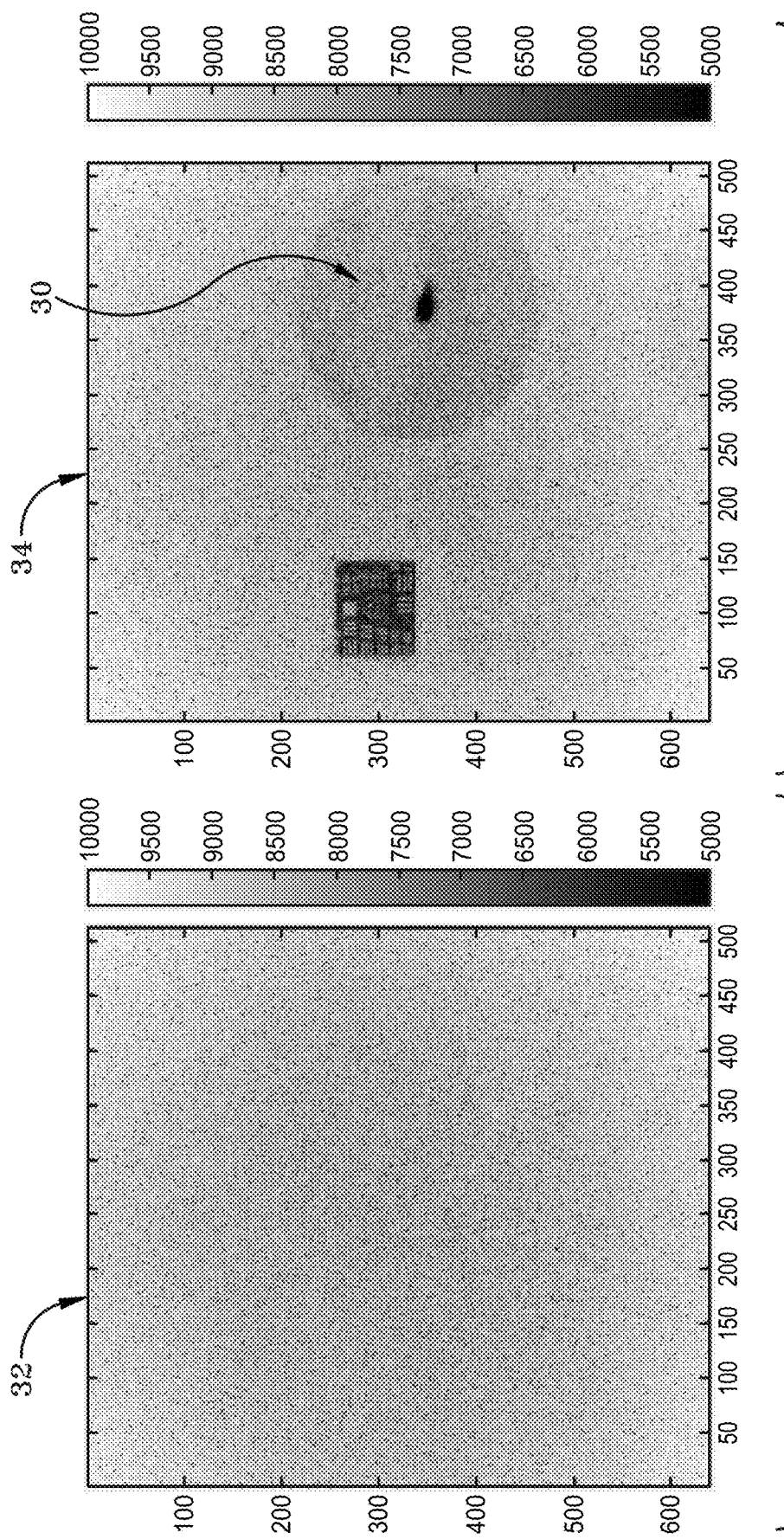
FIG. 2A is a long wavelength infrared (LWIR) reference image.
FIG. 2B is an LWIR scene image.

In one example, and in order to reduce random photon-counting and read noise, an average of the at least one reference image may be computed to produce an averaged reference image 32 (FIG. 2A) and an average of the at least one scene image may be computed to produce an averaged scene image 34 (FIG. 26). In one example, the imaging system 14 utilized to capture the at least one reference image and the at least one scene image may be a Leonardo Eagle. The Leonardo Eagle has a 25-mm focal length f/2.0 lens and images onto 512×640 pixels on the focal plane, with a 24-micron pixel pitch, for an active area of 15.36×12.29 millimeters. The thermal response of the Leonardo Eagle was over the wavelength range from 8-10 microns. The Leonardo Eagle was placed approximately four feet (1,219 millimeters) from test objects, including an Air Force Research Laboratory (AFRL) 1951 resolution panel, and a LWIR test source with an aperture wheel providing point-like sources of various sizes, and a controllable temperature. Due to the long integration time used, the Leonardo Eagle output data, with significant pixel-to-pixel response variation and noise as shown in the averaged reference image 32 and the averaged scene image 34. The averaged reference image 32 and the averaged scene image 34 are 500-frame averages and the imaging system 14 output black-hot images. As shown in FIG. 2A and FIG. 2B, noise and pixel-response variations are evident in the averaged reference image 32 and the averaged scene image 34. Although the at least one reference image and the at least one scene image were averaged over many frames, the LWIR images still showed substantial noise thus requiring more complex processing to preserve edges for PSF estimation as described below.

As stated above, median filtering is typically used to remove persistent noise from images. However, applying a median filter to an entire image introduces additional image blur. In order to preserve edge details for PSF estimation, the system 10 avoids utilizing whole image median filtering, and, instead, utilizes an iterative denoising process to remove defective or "bad" pixels. "Bad" pixels may be defined as any defective pixels including, but not limited to, pixels that are cold or dead (i.e. unresponsive), hot (i.e. improperly energized), excessively noisy (i.e. the value changes with time much more than neighboring pixels), or otherwise defective.

The system 10 may iteratively denoise the averaged reference image 32 and iteratively denoise the averaged scene image 34. The at least one edge 30 contained within the averaged scene image 34 is preserved throughout the denoising processing. In one example, the system 10 and the instructions encoded on the at least one non-transitory computer readable storage medium 20 and the at least one processor 22 may remove bad pixels from the averaged reference image 32. The instructions may set a first bad pixel intensity value threshold and a second bad pixel intensity value threshold. The first bad pixel intensity value threshold may represent a minimum pixel value and the second bad pixel intensity value threshold may represent a maximum pixel value. The first bad pixel intensity value threshold may be any suitable value and the second bad pixel intensity value threshold may be any suitable value.

The instructions may test the averaged reference image 32 against the first bad pixel intensity threshold to determine if any of the pixels of the averaged reference image 32 fail the first bad pixel intensity threshold. If any pixels fail the first bad pixel intensity threshold, the pixels that failed may be replaced with a first local median filter value by median filtering the averaged reference image 32 with a first median filter. The first median filter may be any suitable median filter. This same process may be applied to the averaged scene image 34.

The instructions may test the averaged reference image 32 against the second bad pixel intensity threshold to determine if any of the pixels of the averaged reference image 32 fail the second bad pixel intensity threshold. If any pixels fail the second bad pixel intensity threshold, the pixels that failed may be replaced with the first local median filter value through median filtering with the first median filter. This same process may be applied to the averaged scene image 34.

In one example, in the event there are clusters of bad pixels, the bad pixels may be removed in an iterative process. For example, in the event the averaged reference image 32 has a substantial number of hot pixels, the system 10 may loop over different median filter widths. If the current hot pixel count is equal to zero, then the system 10 median filters a copy of the averaged reference image 32 and stores that copy of the image. If the pixel value of the averaged reference image 32 is less than the second bad pixel intensity threshold, which represents the maximum pixel value in this example, then each pixel that fails the second bad pixel intensity value threshold may be replaced with the first local median filter value from the median filtered copy. If the current hot pixel count does not equal zero, the system may loop the same process with the first median filter having an increased width. This process may iterate until the remaining number of hot pixels is reduced to be within a tolerance value for acceptable image quality. The tolerance value may be any suitable tolerance value. Further, this process may be applied to cold pixels as well. After the number of bad pixels is reduced to be within the tolerance value, the declustered image is stored for further processing. This same iterative denoising process may be applied to the averaged scene image 34. Further, this iterative denoising process does not alter a substantial number of pixels which preserves sharp edges and features. The preservation of edges and features in the images is necessary in order to compute accurate line spread functions and PSFs as described below.

In one example, the iterative denoising process may be applied to the averaged reference image 32 and the averaged scene image 34 to produce an averaged reduced-noise reference image and an averaged reduced-noise scene image. The system 10 and the instructions encoded on the at least one non-transitory computer readable storage medium 20 and the at least one processor 22 may further pre-process the averaged reduced-noise scene image. The system 10 may smooth the averaged reduced-noise reference image to provide a smoothed averaged reduced-noise reference image. The smoothing may be accomplished via filtering, such as low-pass filtering, band pass filtering, or any other suitable filtering.

Figure 3:
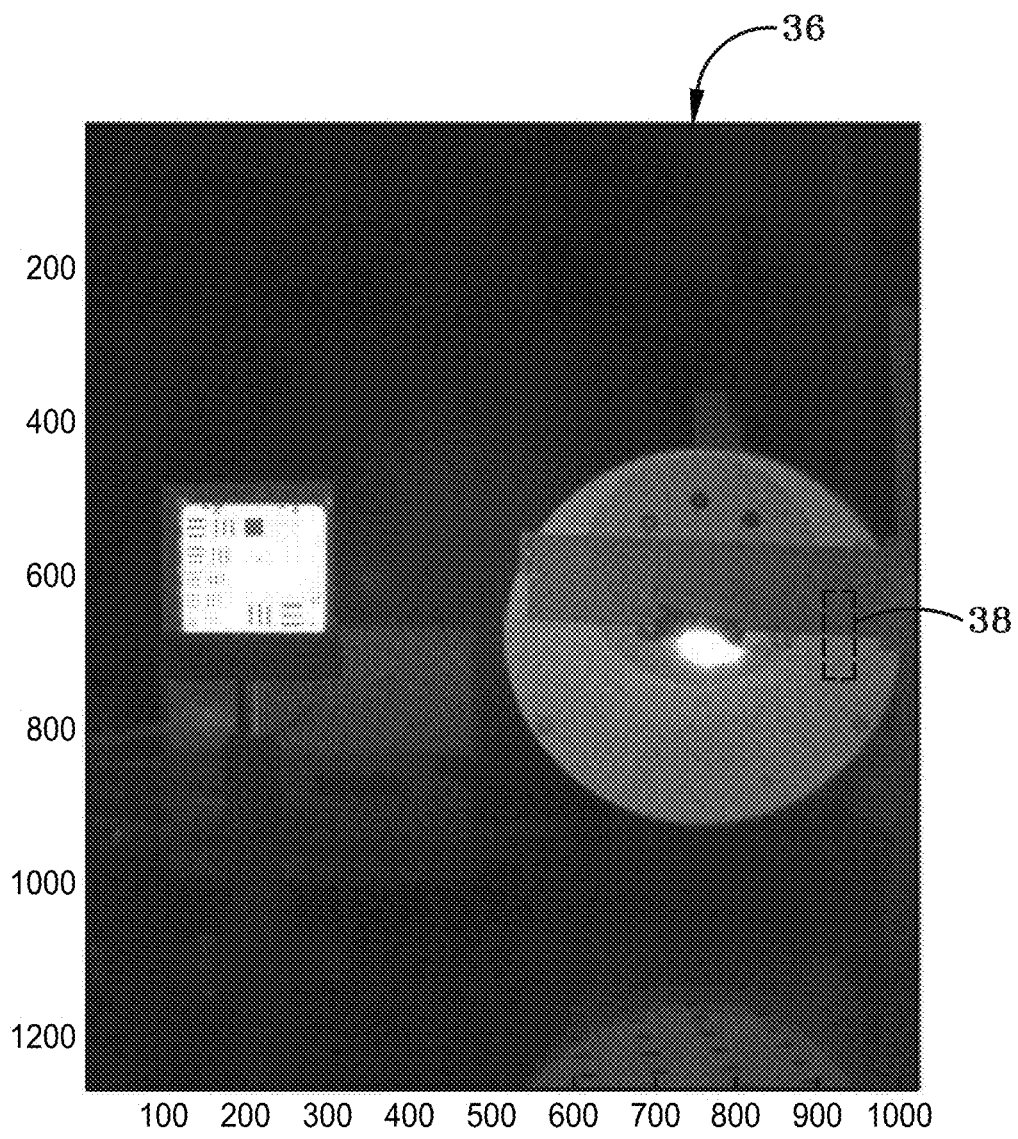
FIG. 3 is a pre-processed LWIR image rendered so that zero equals dark.

The system 10 may subtract the averaged reduced-noise reference image from the averaged reduced-noise scene image to provide a difference image. The system 10 may divide the difference image by the smoothed averaged reduced-noise reference image to provide a pre-processed image. The brightness scale of the pre-processed image may be flipped to produce a zero-equals-dark pre-processed image 36 (FIG. 3). The pre-processed image may then be further processed in any suitable manner.

The pre-processed image may be further processed to estimate a PSF based, at least in part, on edge detection. Generally, standard edge-finding methods, such as Canny and Sobel-Feldman filters, are not suitable for finding edges in images containing noise and typically yield unusable jumbles of multiple false edges where only one edge was actually present. As such, the present disclosure provides a noise-regularized process for edge determination that is robust versus high levels of image noise as more fully described below.

In accordance with one aspect of the present disclosure, the system 10 and the instructions encoded on the at least one non-transitory computer readable storage medium 20 and the at least one processor 22 may extract a region of interest 38 including columns enclosing the at least one straight edge contained within pre-processed and normalized image. In one example, the region of interest 38 may be rectangular; however, any suitable shape may be utilized.

The system 10, through the at least one non-transitory computer readable storage medium 20 and the at least one processor 22, may detect the at least one edge 30 column by column by fitting each column to a sigmoid function. Although the at least one edge may be detected by fitting each column to a sigmoid function, it is envisioned that other suitable functions may also be utilized.

Figure 6A:
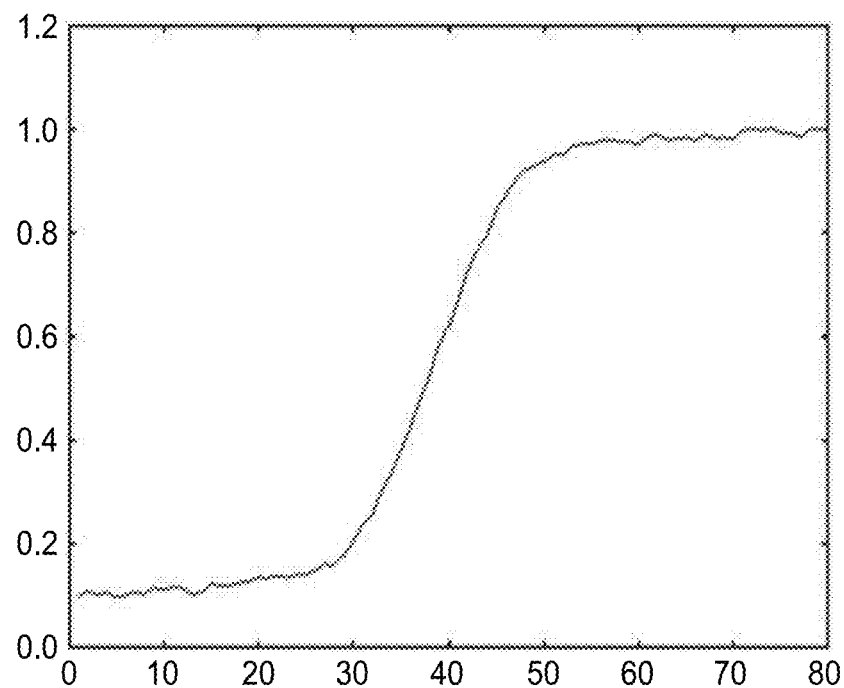
FIG. 6A is a graph of an average super-resolved edge intensity profile.

The system 10 may store sigmoid centers versus a column index of the columns of the region of interest 38 as an estimated sigmoid-fit output vector. The system 10 may fit a line to the estimated sigmoid-fit output vector. In the event that the line is curved, the system 10 may fit any suitable model to the estimated sigmoid-output vector. The system 10 may slide the columns of the region of interest 38 to make a slope of the fitted line of the estimated sigmoid output vector zero. The system 10 may average the columns of the region of interest 38 to compute an edge intensity profile (EIP) as shown in FIG. 6A. The system 10 may build leaky integration differentiation operators. The system 10 may set a regularization parameter $\varepsilon$. The system 10 may compute at least one line spread function (LSF) via noise-regularized inversion of an integration operator operating on the EIP. The system 10 may compute a first noise value from portions of the EIP a distance from the at least one edge. The system 10 may compute a second noise value from a difference between the EIP and an integral of the noise-regularized inversion. The system 10 may determine a value of a local curvature regularization parameter, r, resulting in the first noise value and the second noise value being within a tolerance range. The system 10 may generate the estimated PSF from the at least one LSF.

More particularly, and in accordance with one aspect of the present disclosure, the system 10 may detect the at least one edge 30 by implementing a standard (i.e. Levenberg-Marquardt) non-linear least squares (NLSQ) curve fitting as described below; however, any other suitable curve-fitting methods may be utilized including those used to determine sigmoid-curve parameters.

In one example, the model fitted is the four-parameter sigmoid:

$$Y_{Data} = Parms(1) + \frac{(Parms(2) - Parms(1)) * (X_{Data} - Parms(3))}{\sqrt{Parms(4) + (X_{Data} - Parms(3))^2}} \quad \text{Equation (1)}$$

where $Y_{Data}$ is a pixel-brightness vector, Parms(1) and Parms(2) are vectors of sigmoid-function parameters to be fitted and represent values of the sigmoid function points a distance from the at least one edge 30 being fitted on opposites sides of the at least one edge 30, Parms(3) is a vector of a sigmoid-function parameter to be fitted and represents the at least one edge 30 location, and Parms(4) is a vector of a sigmoid-function parameter to be fitted and represents the width of the at least one edge 30, pixel-location vector $X_{Data}$ is a pixel-location vector. The four parameters Parms(1), Parms(2), Parms(3) and Parms(4) may be determined by fitting the pixel-brightness vector $Y_{Data}$ as a function of the pixel-location vector $X_{Data}$. It is envisioned that other sigmoid functions may be utilized, with their parameters appropriately enumerated and fitted.

Figure 4A:
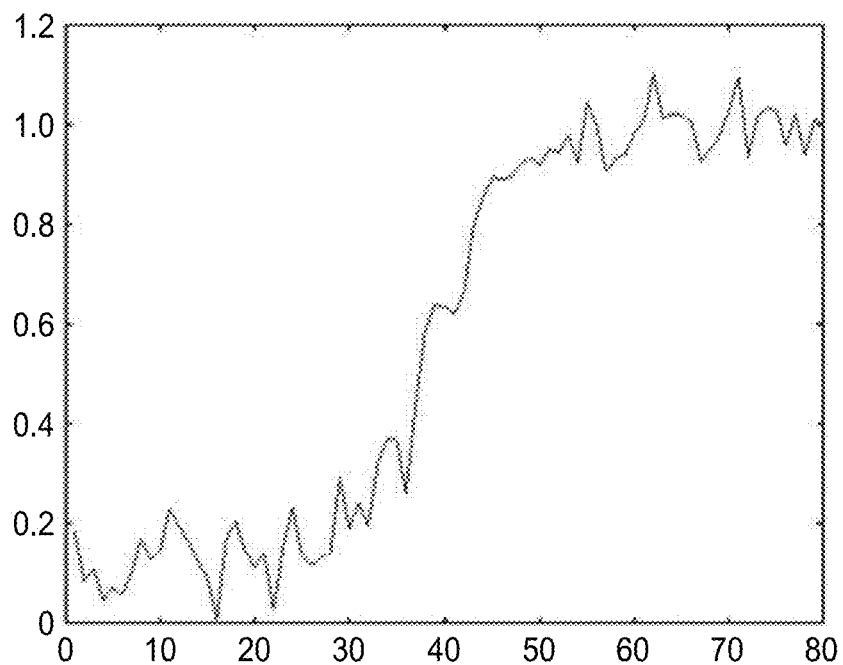
FIG. 4A is a graph of an exemplary single noisy column across a simulated edge.
Figure 4B:
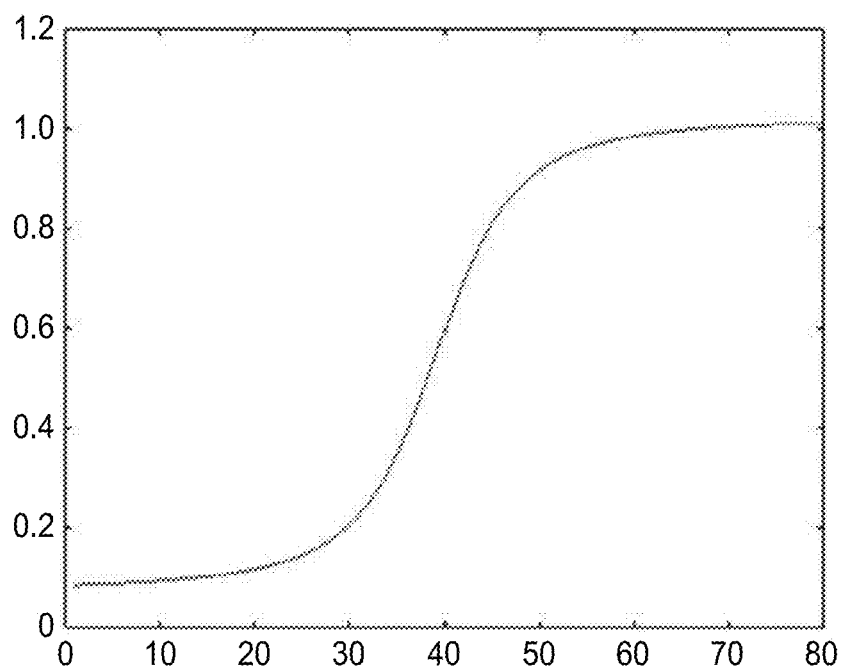
FIG. 4B is graph of an exemplary sigmoid-function fit to a noisy edge.

An exemplary single noisy column across a simulated edge is shown in FIG. 4A. An exemplary sigmoid-function fit to a noisy edge is shown in FIG. 4B. In this example, function fitting was required due to the high noise level in the simulated image. For each column in the region of interest, a sigmoid function was fitted. The row location of the center of the fit, which in this case was pixel 38.1427, is the data point to the linear-regression edge-location estimation routine.

Figure 5A:
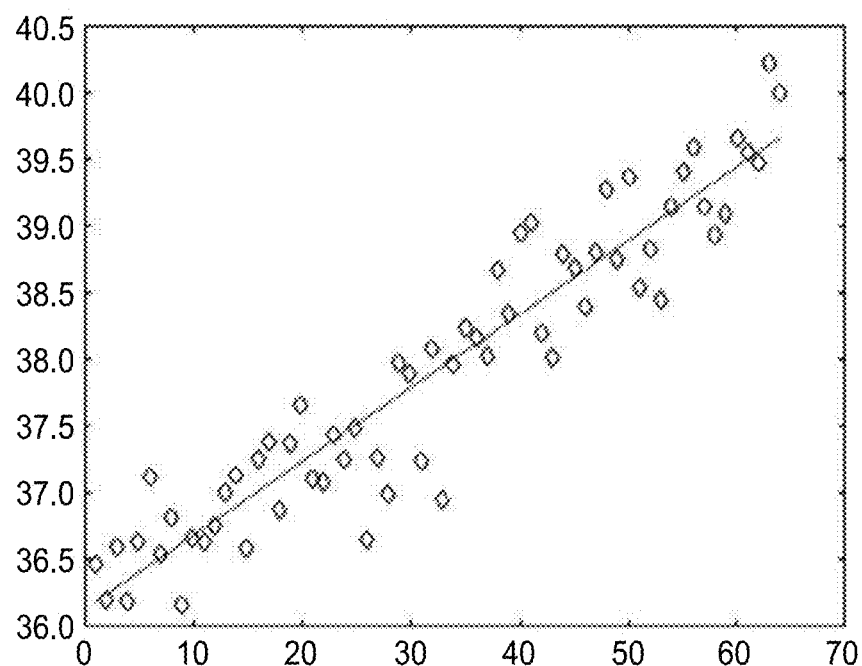
FIG. 5A is a graph of a vector of edge-center-row loci versus region of interest column.
Figure 5B:
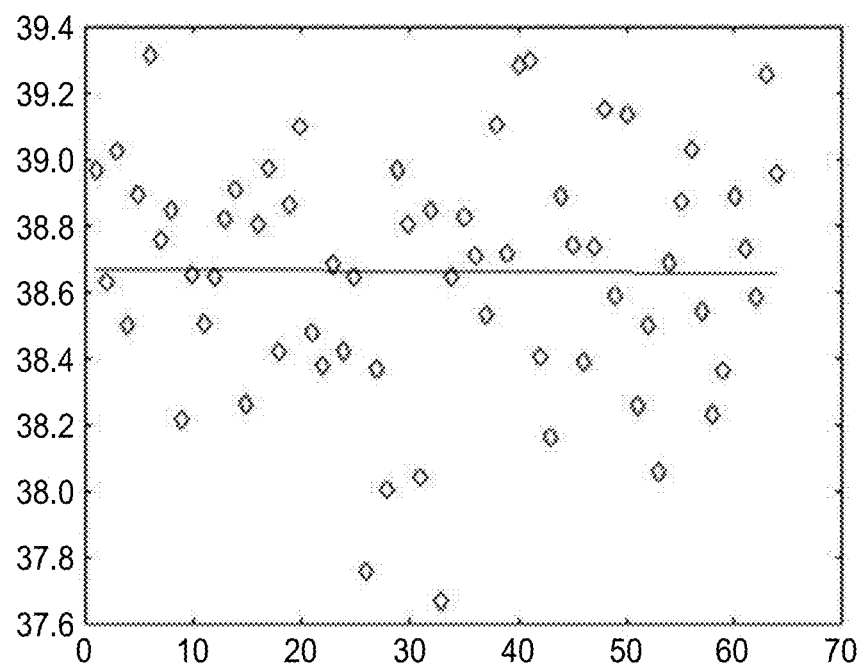
FIG. 5B is a graph of a region of interest image with an edge slope of zero.
Figure 5D:
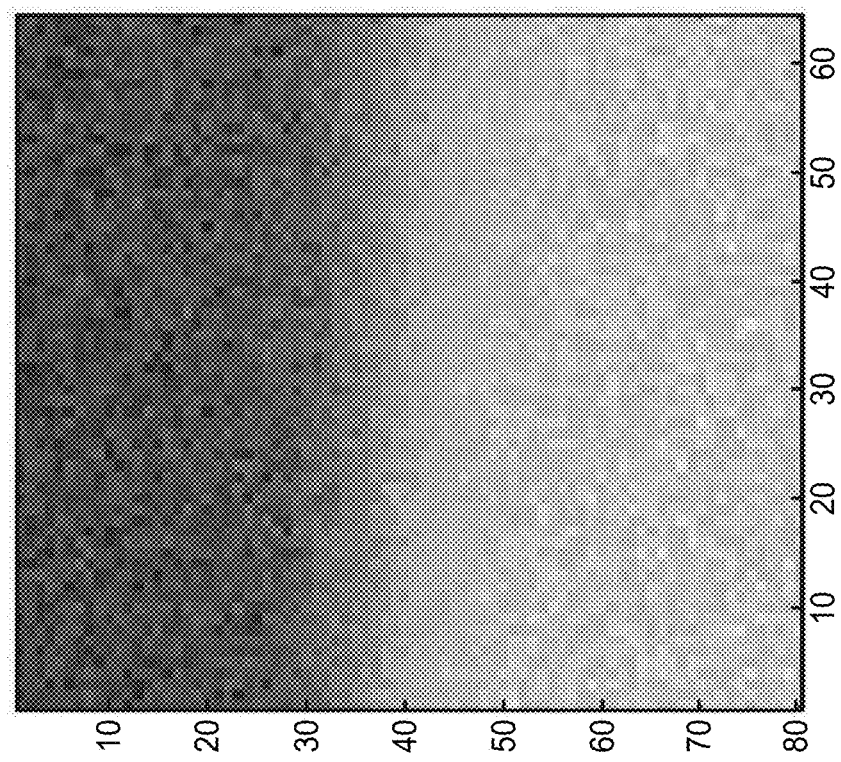
FIG. 5D is an simulated LWIR image showing a noisy region of interest with a slanted edge.
Figure 5C:
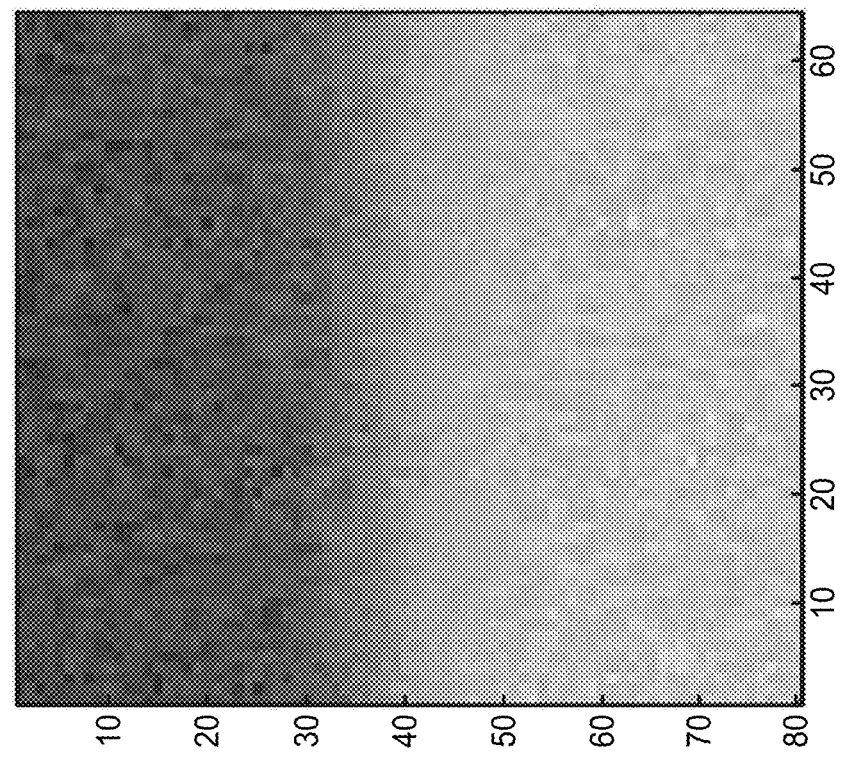
FIG. 5C is a simulated LWIR image showing a noisy region of interest image with an edge slope of zero.

The output of the curve-fitting step is a vector of edge-center-row loci versus region of interest column, as shown in FIG. 5A. After the row loci are determined for each column, the best-fit line's shape is determined from standard polynomial regression, and the image is slid column-by column to make a new region of interest image with an edge slope of zero, as shown in FIG. 5B and FIG. 5C. FIG. 5D represents a noisy simulated region of interest.

From the de-trended images, an average super-resolved EIP may be computed, as shown in FIG. 6A. The EIP in FIG. 6A is the average of the image columns crossing the de-trended edge. An analogous process applies for near-vertical edges, resulting in an EIP that may be estimated by averaging the image rows crossing the edge. Because the edge loci have been determined to a precision finer than one pixel, the column-sliding operation can also be performed in a higher-resolution copy of the region of interest region, so that the average of the slid columns yields a super-resolved EIP.

The EIP computation outlined above is an exemplary computation of a more-general process. In the generalized process, the curve defined by the fitted edges (i.e. edge-center row for each column) may be used to compute directions normal to the fitted edge for each region of interest column. Along each normal direction, a vector is generated crossing the edge, and values may be interpolated from the scene image. The set of vectors so generated is then averaged together to create an edge-intensity profile. The edge-definition computation, normal computation, and edge-crossing vector creation may be performed in any suitable manner.

From the edge-intensity-profile, a line-spread function (LSF) is typically computed by taking the first derivative.

Figure 6B:
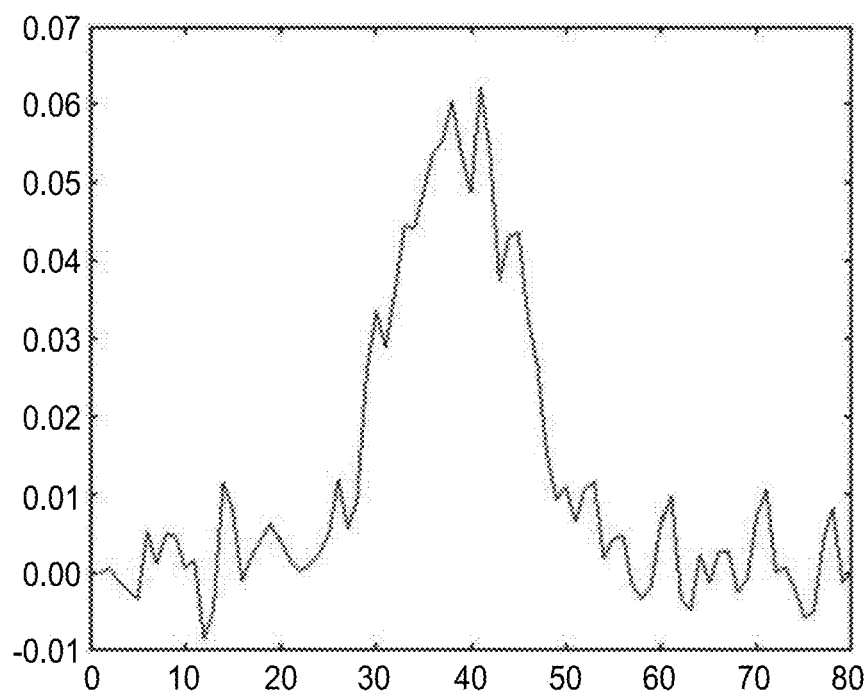
FIG. 6B is a central difference derivative exhibiting substantial noise contamination.

However, a central difference derivative, as shown in FIG. 6B, exhibits substantial noise contamination. A more suitable estimate of the first derivative for noisy data is provided by regularized iteration incorporating regularization based on the local curvature of the edge-intensity-profile.

To compute the regularized derivative, the system may provide a leaky-memory method to minimize contamination from noise sources distant from the line-spread edges. As such, the system 10 does not directly compute the derivative. Instead, the system 10 conducts a regularized inversion of an integration operator, and iterates until the inversions converge. Numerical integration operators are inherently less noisy than numerical differentiation operators; however, the numerical integration operators may be biased by information at long distances from an area of interest. To control the range of the integration operator, a leaky-memory version of the integral may be used, generated as follows: for an input edge-intensity-profile vector $y_{Input}$ of length L, then the leaky-memory integral operator I is a matrix of size L×L, given by:

$$I(k, l) = \begin{cases} 0, & l > k \\ 1, & k = l \\ \exp(-\text{Leak\_Rate} * (k - l)), & l < k \end{cases} \quad \text{Equation (2)}$$

The parameter Leak_Rate causes the integration to discount integrand values from loci far from the edge of interest, which may be referred to as a "leaky memory" integral.

The leaky derivative operator is the inverse of the leaky integral:

$$D = I^{-1} \quad \text{Equation (3).}$$

The initial estimate of the derivative is:

$$d_0 = D y_{Input} \quad \text{Equation (4)}$$

Any suitable alternative methods to obtain an initial estimate of $d_0$ are also possible, such as fitting a model sigmoid curve to the EIP and then generating its derivative. To compute a more-accurate estimate of the LSF from the EIP, the initial estimate $d_0$ is refined iteratively.

The iterations proceed as follows: the (j+1)'st iteration of the derivative vector is given by:

$$d_{j+1} = d_j + \Delta_{j+1}, \text{ where:} \quad \text{Equation (5)}$$

$$\Delta_{j+1}[(I^T I + r D^T E_j D)^{-1} I^T y_{Input} - d_j] \cdot / N_j \quad \text{Equation (6)}$$

In Equation (6), the "·/" operator indicates an element-by-element (i.e. Hadamard) division of matrix elements.
The diagonal matrix $E_j$ has values given by:

$$E_j(k, l) = \frac{\delta(k, l)}{\sqrt{d_j(k)^2 + \varepsilon}}, \quad \text{Equation (7)}$$

derived from the $j^{th}$ estimate of the derivative. The purpose of the term $rD^T E_j D$ in Equation (6) is to prevent the estimated derivative from following random noise fluctuations, rather than the true trend. The value of r is a local-curvature regularization parameter. If the value of r equals zero, then $\Delta_{j=1}=0$, and the derivative never varies from the initial noisy estimate $d_0$. For non-zero values of r, elements of $rD^T E_j D$ will be small when $d_j(k)$ is large, which will have the effect of reducing $\Delta_{j+1}$ for those elements, reducing the effect of large pixel-to-pixel noise fluctuations. Conversely, if the value of $d_j(k)$ is much below neighboring values of k, the $rD^T E_j D$ will serve to increase it on the (j+1)'st iteration. For a given value of r, the iterations proceed until the residual values cease to decrease, or until the maximum number of iterations specified by a user has been reached.

The regularization constant ε is a user-specified, value chosen to prevent zero derivatives from causing divide-by-zero errors. The other regularization constant in Equation (6), r, may be selected to stop the iterations when the regularized derivative reaches the noise level of the input data.

The value of r may be selected to minimize the absolute value of difference of variances according to:

$$\Delta\sigma^2 = |\sigma_{Out}^2(r) - \sigma_0^2|, \quad \text{Equation (8)}$$

where $$\sigma_{Out}^2 = \text{var}(Id_j - y_{Input}), \text{ for } j = \text{fully converged, and} \quad \text{Equation (9)}$$

$$\sigma_0^2 = \text{var}(y_{Input}) \text{ at loci far from edge} \quad \text{Equation (10).}$$

Equation (10) may be computed for pixels located a particular distance from the edge such that the pixel-to-pixel intensity fluctuations are dominated by noise and not by image variations due to the blur of the edged being imaged. In one example, the selection of r by minimizing $\Delta\sigma^2$ insures that the estimated derivative will average through noise values, rather than spuriously following noise fluctuations.

The optimal r-value may be selected by root-finding in a range of candidate r-values (e.g., by interval-halving, Newton's method, or any other suitable methods). For each candidate r value, the iterative process in Equation (5) may be carried out, and the resulting fully-converged derivative vector d is used to compute the residual error $\Delta\sigma^2$ from Equation (8). The final output LSF is the d-vector corresponding to the value of r for which $\Delta\sigma^2$ is zero, for which $\Delta\sigma^2$ is minimized.

It is to be understood that other measures of error may also be effective for generating $\Delta\sigma^{2'}$ such as:

$$\Delta\sigma^2 = [\sigma_{Out}(r) - \sigma_0]^2, \quad \text{Equation (11)}$$

with minimization methods implemented instead of root-finding methods.

The vector $N_j$ controls spurious computational effects at the ends of the derivative vector by applying the iteration operators to an all-white vector w which has L elements all equal to 1:

$$N_j = (I^T I + rD^T E_j D)^{-1}(I^T I)w \quad \text{Equation (12).}$$

A further improvement in the PSF noise is given by performing the regularized-derivative processing twice, both forward and backward along the input edge vector, then averaging the two computations.

In one example, the PSF may be estimated from one or a multiplicity of LSFs by various methods. If only one LSF is available, a PSF may be computed by rotating the LSF around a peak value of the LSF and this computation is suitable when the LSF is symmetric with respect to the peak. One exemplary algorithm is:

$$PSF(x - x_{center}, y - y_{center}) = LSF(\sqrt{(x - x_{center})^2 + (y - y_{center})^2}). \quad \text{Equation (13)}$$

A discretely-pixelated PSF matrix with elements PSF(i,j) may then be determined by interpolating or integrating the continuous function given by Equation (13). In one example, and if rapid de-blurring is important, a separable pixelated PSF may be computed by multiplying a single LSF vector as an outer product with itself to directly create a pixelated PSF according to:

$$PSF(i,j) = LSF(i) LSF(j). \quad \text{Equation (14)}$$

If just two LSF vectors, $LSF_x$ and $LSF_y$, aligned nearly with the imaging system x and y axes are available, Equation 14 may be modified to yield:

$$PSF(i,j) = LSF_x(i) LSF_y(j). \quad \text{Equation (15).}$$

If a multiplicity of LSF vectors for various slant angles θ are available, a PSF matrix may be computed by interpolating between LSFs for neighboring values of θ. A very general method for generating a PSF from one or more LSFs may be to fit a model PSF shape to the LSFs. Exemplary models include, but are not limited to, diffraction functions from apertures of various shapes, or fits to Fourier series, or fits to polynomial basis functions, and any other suitable model. Depending on the PSF model chosen, many suitable fitting methods may be utilized.

The system 10 may then utilize the estimated PSF to deblur the image. In one example, a separable two-dimensional PSF is one which can be derived from the outer product of two one-dimensional vectors A and B along orthogonal axes of the image plane according to:

$$PSF = AB^T \quad \text{Equation (16)}$$

If Equation (16) holds, then the convolution of the PSF with an object scene to create the PSF-blurred image is expressible as a set of matrix multiplications:

$$o_{Blurred} = L_A O R_B^T. \quad \text{Equation (17)}$$

The matrices $L_A$ and $R_B$ are Toeplitz in structure, and generated from the vectors A and B as follows:

$$L_A = \begin{bmatrix} A, 0, 0, \ldots \\ 0, A, 0, \ldots \\ \vdots \end{bmatrix}, R_B = \begin{bmatrix} B, 0, 0, \ldots \\ 0, B, 0, \ldots \\ \vdots \end{bmatrix}. \quad \text{Equation (18)}$$

The goal of de-blurring processing is to recover the object O from the blurred image $o_{Blurred}$, given knowledge of the PSF. For PSFs with the separable form shown in Equation (17), the recovery may be done by multiplying on the left and right by pseudo inverses of $L_A$ and $R_B^T$. The pseudo-inverses may be obtained via (singular-value decomposition (SVD), or any other suitable methods for solving ill-posed matrix inverses.

In one exemplary method, the inversion may be done via regularized normal equations, as follows:

$$O_{Estimated} = [L_A^T L_A + \alpha 1]^{-1} L_A^T o_{Blurred} R_B [R_B^T R_B + \alpha 1]^{-1}, \quad \text{Equation (19)}$$

where 1 is the identity matrix.

One exemplary advantage of using Equation (19) is that it will give a useable image in cases where the blur is so severe that Fourier de-convolution fails. Equation (19) is also much faster than the most generic non-Fourier de-convolution via compressive-sensing inversion. Note that, if the PSF is non-trivial, image acquisition is always a form of compressive sensing. The constant α in Equation 19 mitigates ill-posed inversion and noise, which is commonly referred to as Tikhonov regularization. One further step is required to finalize the image recovery: The system 10 may perform normalization by an all-white image to remove processing artifacts at the edges of the image according to:

$$O_{Final} = O_{Estimated}{'}/W_{Estimated}$$

$$W_{Estimated} = [L_A{}^T L_A + \alpha 1]^{-1} L_A{}^T L_A W R_B{}^T R_B [R_B{}^T R_B + \alpha 1]^{-1}$$

Equation (20)

In one example, Equation (16)-Equation (20) may be applied where the PSF is expressible as a sum of separable forms. If Δ represents a two-dimensional discrete delta-function image, then a PSF with n separable terms is expressed as $$PSF = L_1 \Delta R_1{}^T L_2 \Delta R_2{}^T + \ldots + L_n \Delta R_n{}^T.$$

Equation (21)

Figure 8A:
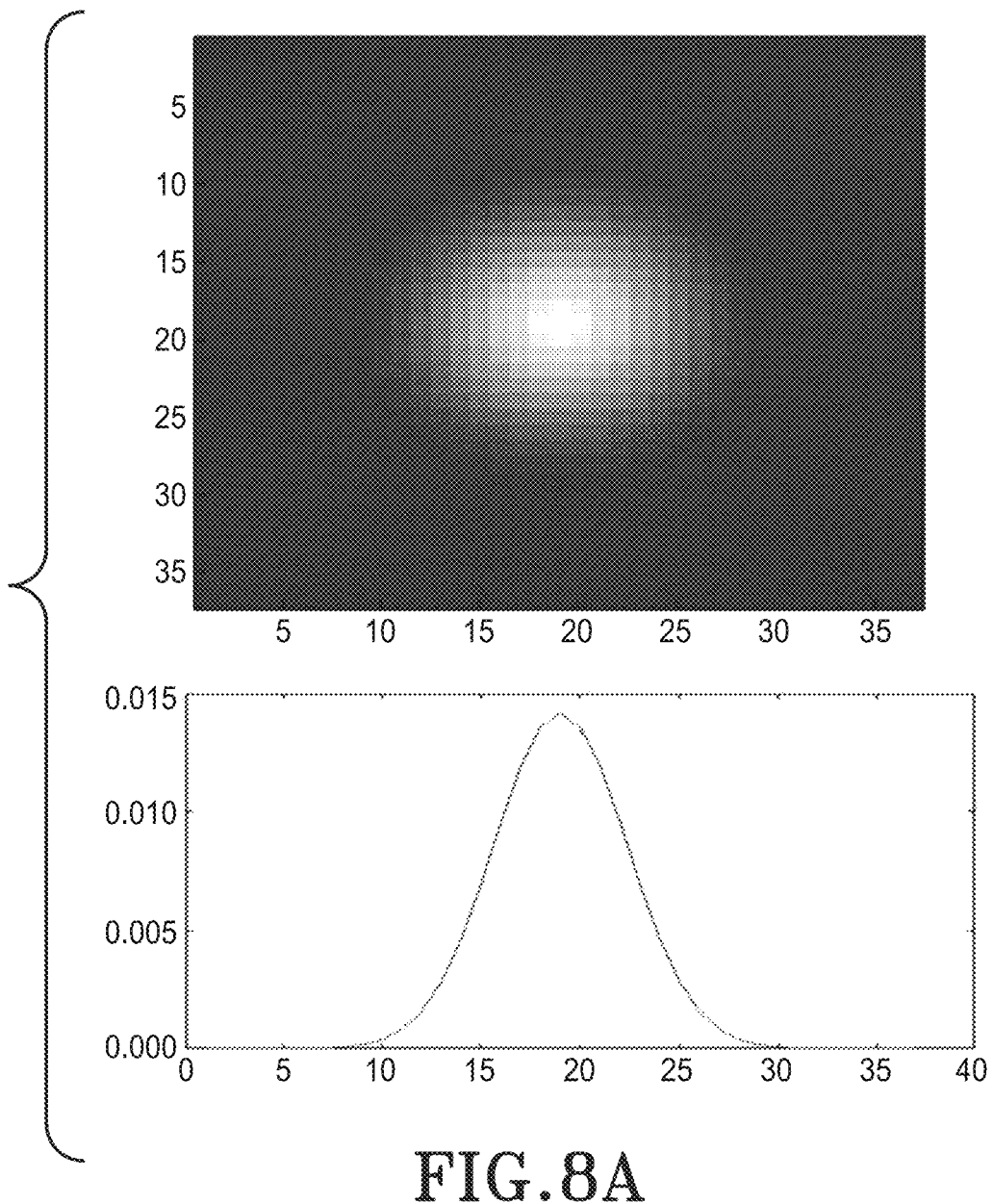
FIG. 8A is an LWIR image of a Gaussian where the fwhm is 7 pixels and the rank is one.
Figure 8B:
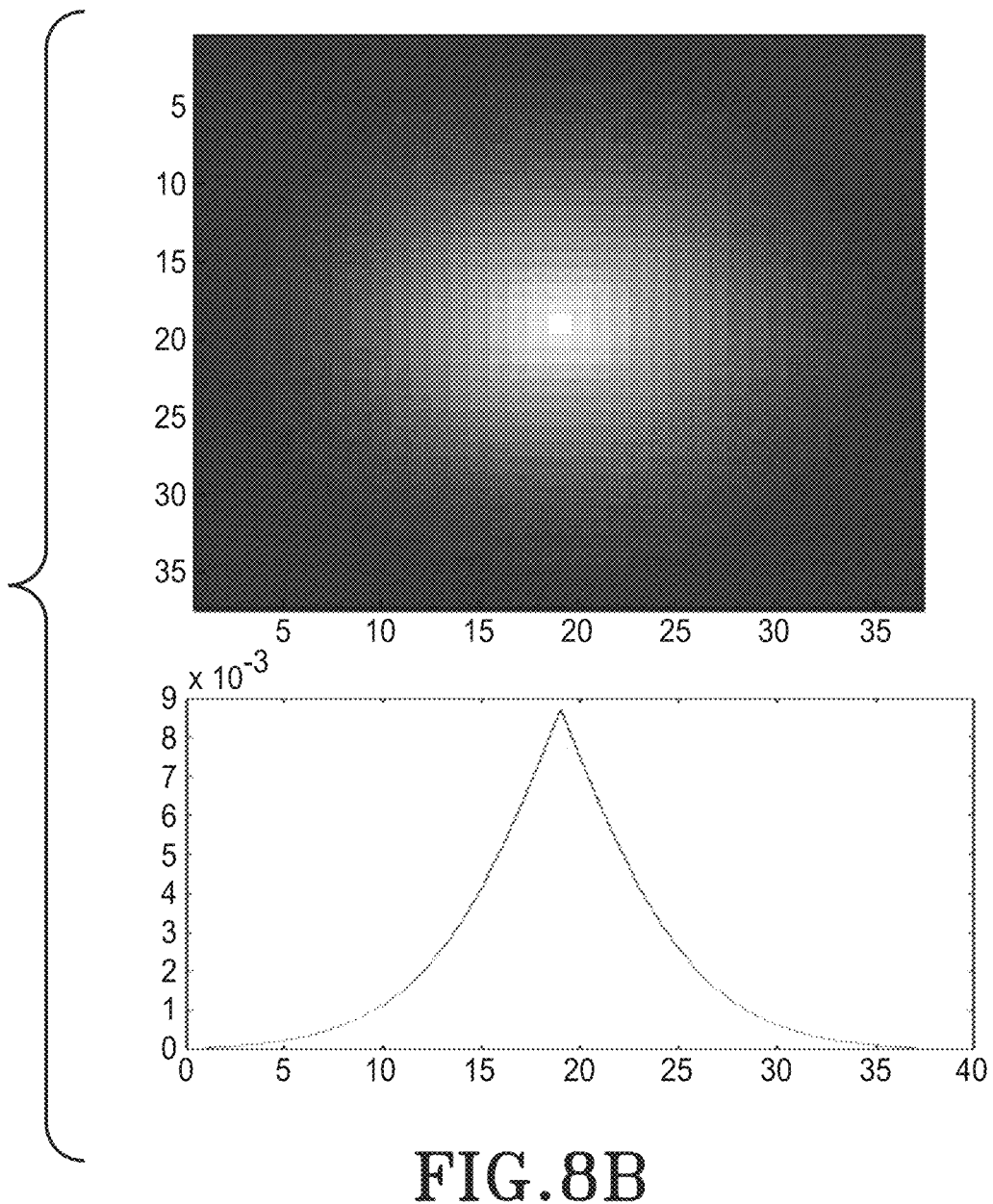
FIG. 8B is an LWIR image of an Airy function where the fwhm is 7 pixels and the rank is seventeen.

It is always possible to determine a sum such as Equation (21) for an arbitrary PSF, via singular value decomposition (SVD). The maximum number of terms is given by the rank of the SVD of the PSF (i.e. rank equals number of non-zero SVD eigenvalues). In terms of SVD, PSFs which are describable as a single outer product of one-dimensional vectors have rank one (i.e. those PSFs have a single eigenvalue and their SVD decomposition is a single pair of vectors). Exemplary PSFs having rank one include Gaussian functions and diffraction from rectangular apertures. For PSFs with more than one eigenvalue, de-convolution of the PSF from the recorded image may still be fast and accurate if the PSF can be decomposed into relatively few separable functions. Similar-looking PSFs may have very different ranks, as illustrated in FIG. 8A and FIG. 8B. FIG. 8A shows the rank of a Gaussian where the full width at half maximum (fwhm) is 7 pixels and the rank is one. FIG. 8B shows an Airy function where the fwhm is 7 pixels and the rank is seventeen. For example, the only radially-symmetric function with rank 1 (i.e. already separable) is a Gaussian. All other radially-symmetric functions have a higher rank, and require more processing to de-convolve. However, there are many non-radially-symmetric two-dimensional PSFs that have rank 1, including diffraction functions from rectangular apertures.

Because the computational burden of deconvolving PSFs increases with rank, it is useful to determine the lowest-rank approximation to a PSF that adequately describes the blur. This is accomplished by estimating the eigenvalue threshold below which the PSF component is below the noise threshold of the image. In one example, the number of PSF terms may be limited to a maximum determined by the processing-speed and memory required of the system 10.

If the PSF is a sum of separable PSFs, then the image is a sum according to:

$$I = \sum_j L_j O R_j{}^T.$$

Equation (22)

If the image $o_{Blurred}$ has $r_I$ rows and $c_I$ columns, and each PSF has $r_P$ rows and $c_P$ columns, then the object O has:

$$r_O = (r_I + r_P) \text{ rows and}$$

Equation (23)

$$c_O = (c_I + c_P) \text{ columns.}$$

Equation (24)

Thus, each left-hand matrix $L_j$ has $r_I$ rows and $r_O$ columns, and each right-hand matrix $R_j$ has $c_I$ rows and $c_O$ columns. The image can also be expressed as a matrix multiplication of the form:

$$o_{Blurred} = [L_1 \; L_2 \; \ldots \; L_n] \begin{bmatrix} R_1^T \\ R_2^T \\ \vdots \\ R_n^T \end{bmatrix} \begin{bmatrix} O & 0 & \ldots & 0 \\ 0 & O & \ldots & 0 \\ \vdots & \vdots & \ddots & \\ 0 & 0 & & O \end{bmatrix} =$$

Equation (25)

$$L \begin{bmatrix} O & 0 & \ldots & 0 \\ 0 & O & \ldots & 0 \\ \vdots & \vdots & \ddots & \\ 0 & 0 & & O \end{bmatrix} R.$$

The matrix L has dimensions $r_I \times nr_O$ and the matrix R has dimensions $c_I \times nc_O$. The recovery of the object image can be done via the same procedure as in Equation (19)-Equation (21). One difference is that the estimated object will have n copies of the desired solution, arranged along the diagonal of a larger matrix. The higher n, the more ill-posed the recovery, requiring a higher degree of regularization. Thus, optimal recovery may require reducing the number of PSF terms included.

Inverting Equation (25) or the single-component version Equation (16) may be referred to herein as Compressive Imaging (CI) de-blurring.

Since the SVD is being used to determine the rank of the PSFs, it is suitable to re-cast the inversion in terms of SVD. In SVD, the rectangular matrix L with dimensions $r_L \times c_L$ with $r_L < c_L$ is re-written as a product of square matrices:

$$L = U_L \Sigma_L V_L^T,$$

Equation (26)

where $U_L$ is an $r_L \times r_L$ matrix of unitary basis functions, and $V_L$ is a $c_L \times c_L$ matrix of unitary basis functions, and $\Sigma_L$ is a $c_L \times c_L$ diagonal matrix in which the first $r_L$ elements are non-zero eigenvalues $s_j$, j=1: $r_L$ of the transformation, and the remaining eigenvalues for j=(1+$r_L$): $c_L$ are all zero. Because of the degenerate zero eigenvalues, the diagonal matrix $\Sigma_L$ is not invertible. However, a regularized pseudo-inverse can be obtained by generating a new diagonal matrix $D_L$ such that:

$$D_{L i,j} = \delta_{i,j} \sigma_j / (\sigma_j^2 + \alpha).$$

Equation (27)

The approximate inversion is then:

$$L^{-1} = V_L D_L U_L^T.$$

Equation (28)

In one example, analogous mathematics applies to the right-hand matrix R. In addition to Tikhonov-regularized CI, we also implemented Tikhonov-regularized Fourier transform (FT) processing. FT processing is less robust versus ill-posed inversions caused by large PSFs, but is generally faster for compact PSFs than CI inversion. Both FT and CI inversions are faster for separable modulation transfer functions (MTFs) than for arbitrary forms.

Figure 6C:
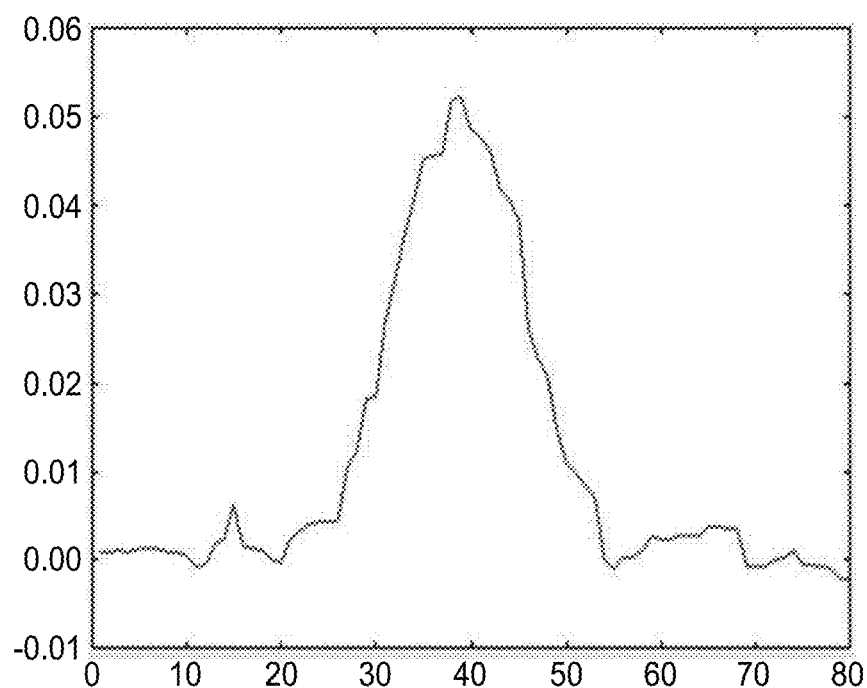
FIG. 6C is a graph of a noise-regularized point spread function (PSF) estimate.
Figure 6D:
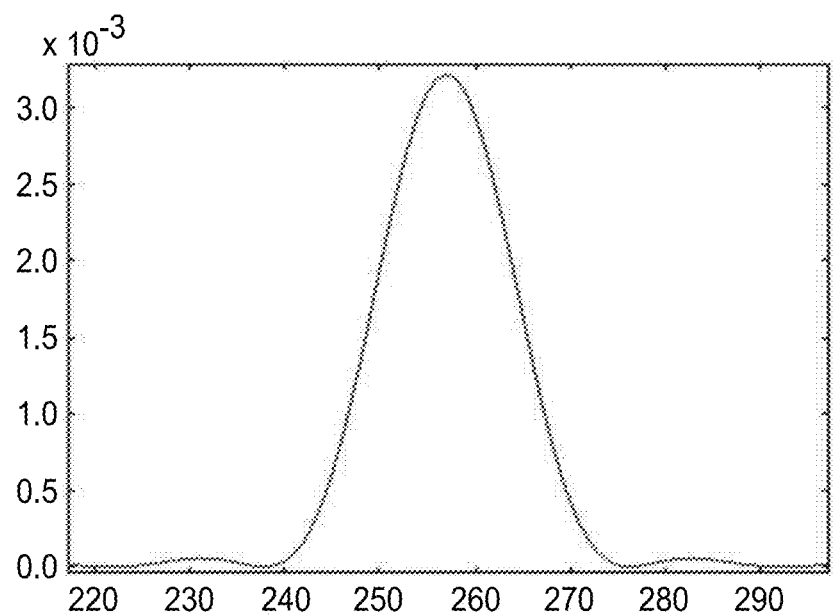
FIG. 6D is an input PSF having a full width at half maximum (fwhm) of 16.6 pixels.

For synthetic data, the processes described above yielded the result shown in FIG. 6C, which is the noise-regularized PSF estimate. The noise regularized PSF estimate more closely matches the input PSF shown in FIG. 6D.

Figure 7A:
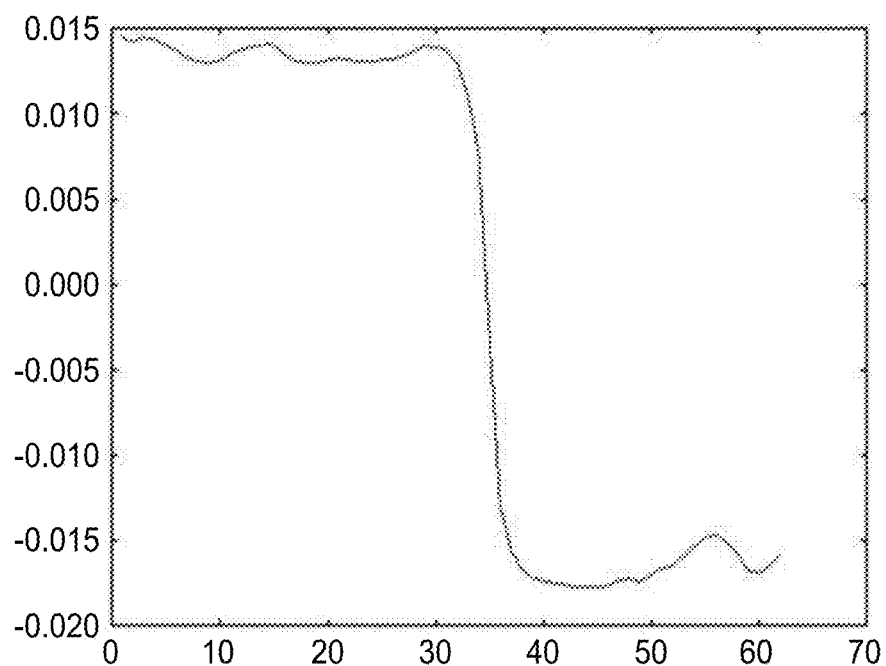
FIG. 7A is a graph of a super-resolved edge intensity profile of a sharp edge exhibiting noise and artifacts due to the small size of the PSF region.
Figure 7B:
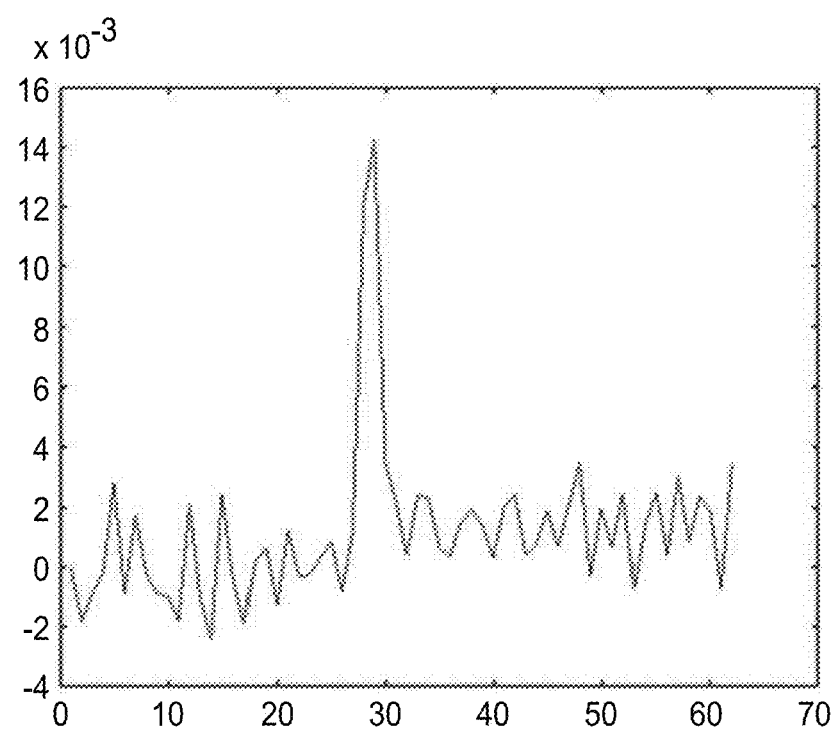
FIG. 7B is a graph of a central-difference which magnifies the noise.
Figure 7C:
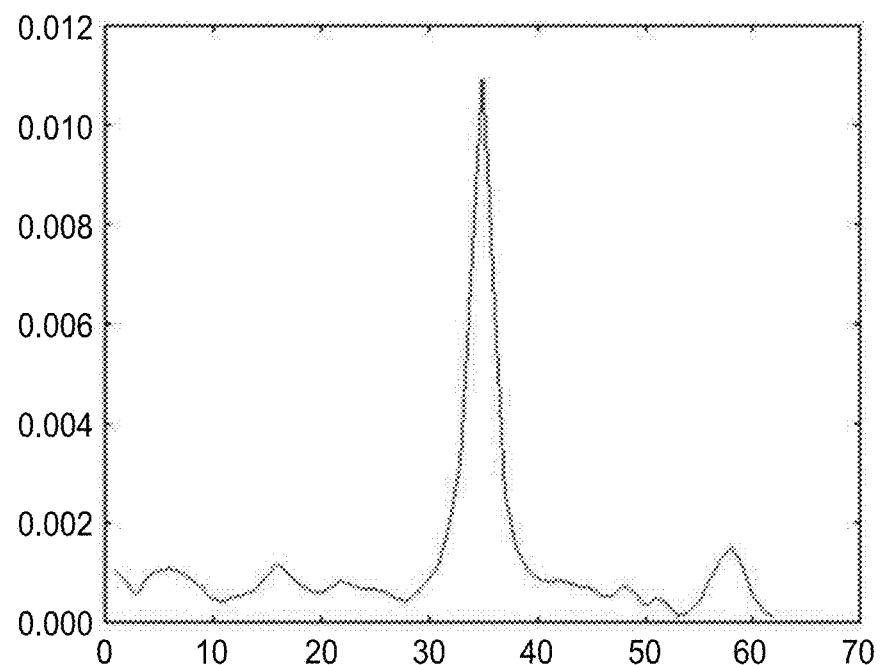
FIG. 7C is a graph of a derivative provided by noise-regulated processing.
Figure 7D:
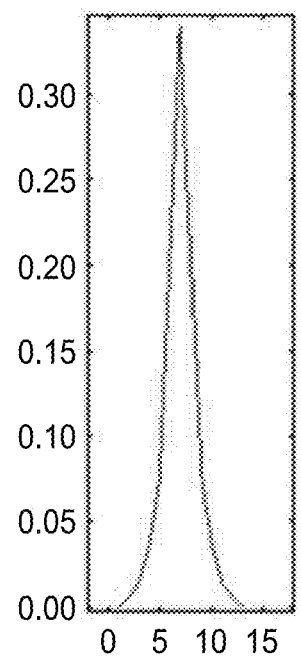
FIG. 7D is a graph of a final PSF which is the central portion of FIG. 7C that is above a noise floor.

The processes described above were also applied to real-world LWIR data, analyzing the region of interest 38 in FIG. 3, obtaining the results show in FIG. 7A-FIG. 7D. Away from the edge, residual noise remained, so that the final PSF was selected to contain only those values above the residual noise values, as shown in FIG. 7D. Since point-like sources could not be used for PSF estimation, a region of interest having a slanted edge was identified in the image as shown in FIG. 3. The edge-spread PSF estimation process described above was applied over the region of interest. Results are shown in FIG. 7A-FIG. 7D. With just one edge, it was assumed that that the edge's edge-spread applied in two orthogonal camera axes, automatically generating a separable PSF. FIG. 7A shows a super-resolved edge intensity profile of a sharp edge exhibiting noise and artifacts due to the small size of the PSF region. FIG. 7B shows a central-difference which magnifies the noise. FIG. 7C shows a much cleaner derivative provided by noise-regulated processing, though some artifacts are still evident. FIG. 7D shows the final PSF which is the central portion of FIG. 7C that is above the noise floor.

Figure 9B:
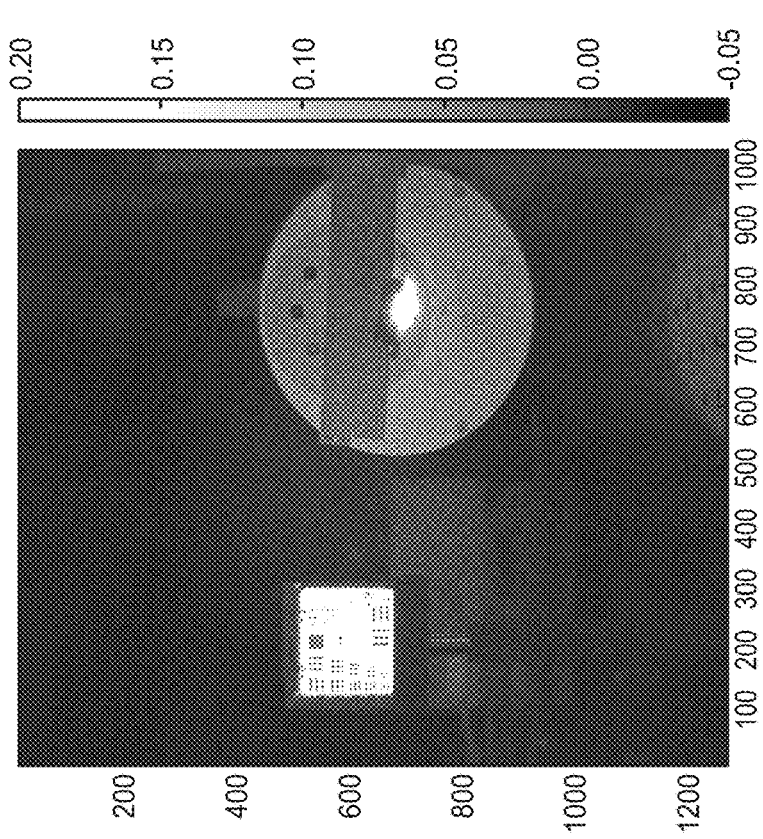
FIG. 9B is an LWIR image showing the results of FT deblur processing.
Figure 9A:
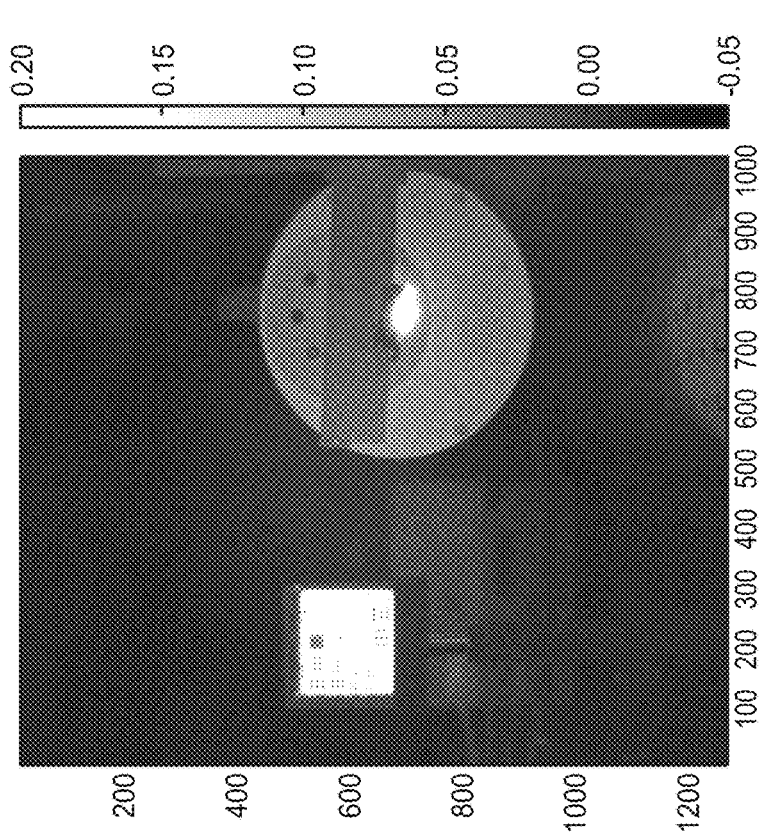
FIG. 9A is an LWIR input image.
Figures 10A, 10B:
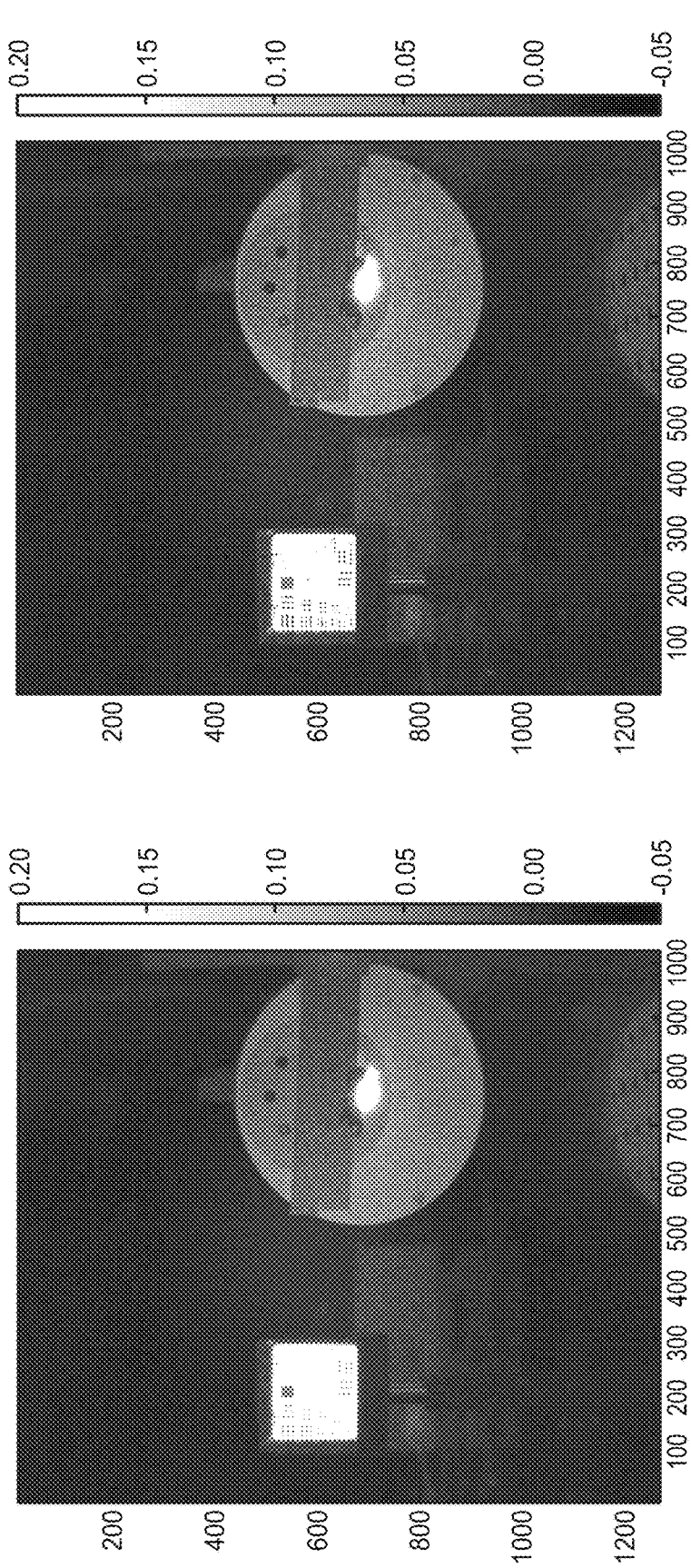
FIG. 10A is an LWIR input image.
FIG. 10B is an LWIR image showing the results of CI deblur processing.

The estimated PSF was then used in the Fourier transform (FT) and Compressive Imaging (CI) deblur processing. FIG. 9A shows the input image and FIG. 9B shows the results of the FT deblur processing. FIG. 10A shows the input image and FIG. 10B shows the results of the CI deblur processing. In these examples, the regularization parameters were selected to optimize the subjective appearance of the images. Further, it is envisioned that the regularization parameters may be selected in any suitable manner.

FIG. 11A represents the input image, FIG. 11B represents the FT deblur processing results and FIG. 11C represents the CI deblur processing results. Further, AFRL 1951 tri-bar groups yield estimates for modulation versus spatial frequency. Group (−1, 4), which is outlined with a dashed box in FIG. 11A, FIG. 11B and FIG. 11C, approximates the Nyquist frequency for these exemplary results. The regularization parameters for the FT and CI processing were selected to make the noise variance in the processed image equal the noise variance of the input image in FIG. 11A.

Figure 12:
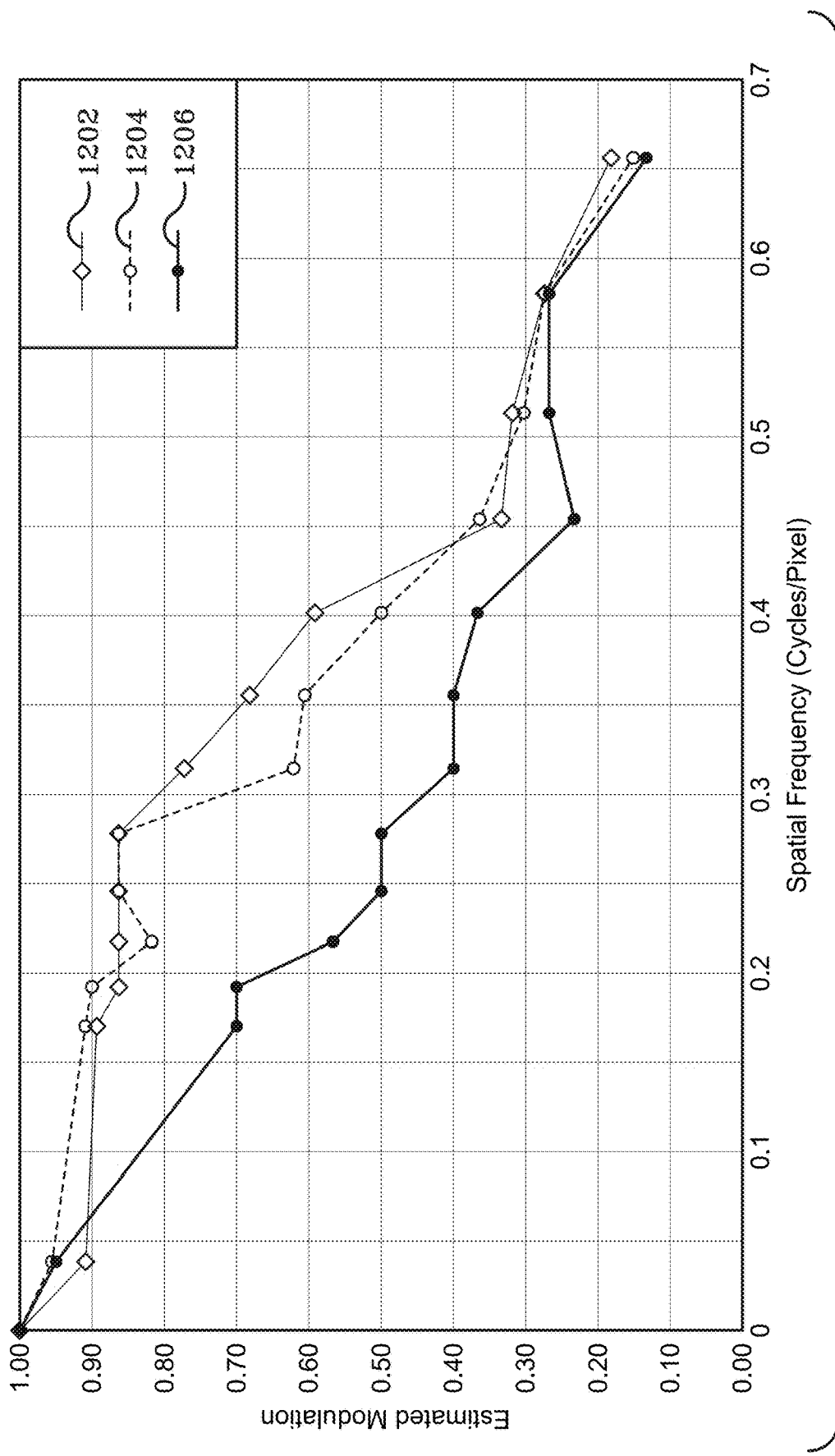
FIG. 12 is a graph of computational improvement of image quality comparing an FT modulation, a CI modulation and an input modulation.

Quantifying the image improvement may be accomplished in a variety of ways. For example, a USAF 1951 resolution tri-bar test chart, and the modulation versus spatial frequency determined for the raw and de-blurred images may be utilized to quantify the performance of the de-blur instructions. The numerical results are summarized in the graph of FIG. 12 which depicts the computational improvement of the image quality. Line 1202 represents FT modulation, line 1204 represents CI modulation and line 1206 represents input modulation. The results of the graph are based on an unstopped f/2 case. Because the PSF is very compact, both the regularized FT and the CI deblur processing yielded similar results. In this example, the performance limiter was more due to noise than to ill-posed matrix inversion. The improvement is most striking in the mid-frequencies near ½ of the focal-plane Nyquist frequency, where the MTF improves from 50% in the input image to 90% in the de-blurred images. Beyond the Nyquist frequency, no improvement is expected or observed.

It is envisioned that the system 10 may be utilized to characterize the PSF of the imaging system 14. Additionally, it is envisioned that the system 10 may characterize the PSF of the imaging system 14 and a PSF of a scattering medium including, but not limited to, air, water, fog, haze, mist, biological tissue or any other suitable scattering medium. As such, the teachings of the present disclosure may be utilized in various technological fields.

The system 10 and method for pre-processing images and estimating PSFs for image deblurring in a noise-robust manner provides improvements beyond its original technical field. More particularly, the improvements provided by the system 10 and method implemented thereof relate to an advance in the technical field of image pre-processing and estimation of PSFs for image deblurring. The system 10 and method thereof provide additional specific, meaningful, and novel teachings to image deblurring beyond what is well-understood, routine, or conventional in the image deblurring field. Additionally, it is to be understood that the system 10 of the present disclosure pertains to a particular use with respect to imagery data obtained that is processed for the particular use described herein.

In another particular embodiment, the system 10 enables the computer 18 to deblur images at operationally-relevant temperatures by, at least in part, avoiding the use of median filtering over the entire images and replacing derivative-based edge detection with noise-regularized integral equations, as described above, in a manner that was not previously able to be accomplished. Thus, the system 10 and method implemented thereof of the present disclosure provide improvements in computer-centric or Internet-centric technology. In another particular embodiment, the at least one non-transitory computer readable storage medium 20 housed within the computer 18 in operable communication with the at least one processor 22 can be implemented with different types of processors without sacrificing the efficiency of the system, thus, improving the overall computer memory and processing function to pre-process images and estimate PSFs for image deblurring. Stated otherwise, the system 10 and method of the present disclosure, which are encompassed by the appended claims, include elements that amount to significantly more than an abstract idea because they show an improvement in the functioning of the computer itself and also show an improvement to another technology/technical field (such as image pre-processing and image deblurring. More particularly, the system and method of the present disclosure recites additional steps of iteratively denoising images in a manner that preserves edges to allow the preserved edges to be processed for estimation of PSFs including, but not limited to, generating, with the at least one processor 22, at least one line spread function (LSF) via noise-regularized inversion of an integration operator operating on the edge intensity profile and generating, with the at least one processor 22, the estimated PSF from the at least one LSF. These additional steps tie some of the operation to the at least one processor's 22 ability to process the imagery. These steps add meaningful teachings to the concept of image pre-processing and image deblurring and therefore add significantly more to the idea than mere computer implementation. The present disclosure, when taken as a whole, does not simply describe the pre-processing and de-blurring of imagery via mathematical operations and receiving and storing data, but combines the steps of processing the imagery data with steps for preserving edges and PSF estimation analysis based on the preserved edges. Accordingly, the present disclosure goes beyond the mere concept of retrieving and combining data using a computer.

Various inventive concepts may be embodied as one or more methods, of which an example has been provided. The acts performed as part of the method may be ordered in any suitable way. Accordingly, embodiments may be generated in which acts are performed in an order different than illustrated, which may include performing some acts simultaneously, even though shown as sequential acts in illustrative embodiments.

For example, FIG. 13 depicts an exemplary method for pre-processing an image generally at 1300. The method 1300 may include iteratively denoising, with a processor, a reference image to create a reduced-noise reference image, which is shown generally at 1302. The method 1300 may further include iteratively denoising, with the at least one processor, a scene image containing at least one straight edge within the scene image to create a reduced-noise scene image, wherein the at least one straight edge is preserved, which is shown generally at 1304. The method 1300 may further include smoothing, with the at least one processor, the reduced-noise reference image to provide a smoothed reduced-noise reference image, which is shown generally at 1306. The method 1300 may further include subtracting, with the at least one processor, the reduced-noise reference image from the reduced-noise scene image to provide a difference image, which is shown generally at 1308. The method 1300 may further include dividing, with the at least one processor, the difference image by the smoothed reduced-noise reference image to provide a pre-processed image, which is shown generally at 1310. The method 1300 may further include identifying, with the at least one processor, bad pixels in the reference image, which is shown generally at 1312. The method 1300 may further include replacing, with the at least one processor, the bad pixels in the reference image with median-filtered values, which is shown generally at 1314. The method 1300 may further include iterating until all bad pixels of the reference image are replaced, which is shown generally at 1316. The method 1300 may further include identifying, with the at least one processor, bad pixels in the scene image, which is shown generally at 1318. The method 1300 may further include replacing, with the at least one processor, the bad pixels in the scene image with median-filtered values, which is shown general at 1320. The method 1300 may further include iterating until all bad pixels of the scene image are replaced 1322.

As another example, FIG. 14 depicts an exemplary method for estimating a point spread function (PSF) generally at 1400. The method 1400 may include obtaining, with a processor, an edge intensity profile from at least one straight edge within an image, which is shown generally at 1402. The method 1400 may include generating, with the at least one processor, at least one line spread function (LSF) via noise-regularized inversion of an integration operator operating on the edge intensity profile, which is shown generally at 1404. The method 1400 may include generating, with the at least one processor, the estimated PSF from the at least one LSF, which is shown generally at 1406. The method 1400 may include building, with the at least one processor, leaky integration differentiation operators, which is shown generally at 1408. The method 1400 may include setting, with the at least one processor, a regularization parameter, which is shown generally at 1410. The method 1400 may include generating, with the at least one processor, a first noise value from portions of the edge intensity profile a distance from the at least one straight edge, which is shown generally at 1412. The method 1400 may include generating, with the at least one processor, a second noise value from a difference between the edge intensity profile and an integral of the noise-regularized inversion of the integration operator operating on the edge intensity profile, which is shown generally at 1414. The method 1400 may include determining, with the at least one processor, a value of a local curvature regularization parameter resulting in the first noise value and the second noise value being within a tolerance range, which is shown generally at 1416. In one example, the at least one straight edge 30 contained within the image is slanted relative to a focal plane of an imaging system. In another example, the at least one straight edge 30 contained within the image is transformed from at least one curved edge. In one example, the estimated PSF represents an estimated PSF of an imaging system. In another example, the estimated PSF represents an estimated PSF of an imaging system 14 and a scattering medium. The method 1400 may include deblurring, with the at least one processor, the image based on the estimated PSF, which is shown generally at 1418. In one example, the deblurring the image based on the estimated PSF is accomplished by noise-regularized Fourier transform (FT) deblur processing. In another example, the deblurring the image based on the estimated PSF is accomplished by noise-regularized Compressive Imaging (CI) deblur processing. The method 1400 may include that the step of generating the estimated PSF from the at least one LSF further comprises fitting, with the at least one processor, a PSF model to the at least one LSF to generate the estimated PSF, which is shown generally at 1420. The method 1400 may include that the step of generating the estimated PSF from the at least one LSF further comprises taking, with the at least one processor, an outer product of the at least one LSF with the at least one LSF to generate the estimated PSF, which is shown generally at 1422. The method 1400 may include that the step of generating the estimated PSF from the at least one LSF further comprises rotating, with the at least one processor, the at least one LSF around a peak of the at least one LSF to generate the estimated PSF, which is shown generally at 1424.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment,"

"an exemplary embodiment," or "other embodiments," or the like, are not necessarily all referring to the same embodiments.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

The invention claimed is:

1. A method for pre-processing an image comprising:
    iteratively denoising, with at least one processor, a reference image to create a reduced-noise reference image;
    iteratively denoising, with the at least one processor, a scene image containing at least one straight edge within the scene image; wherein iteratively denoising the scene image creates a reduced-noise scene image; wherein the at least one straight edge is preserved;
    smoothing, with the at least one processor, the reduced-noise reference image to provide a smoothed reduced-noise reference image;
    subtracting, with the at least one processor, the reduced-noise reference image from the reduced-noise scene image to provide a difference image; and
    dividing, with the at least one processor, the difference image by the smoothed reduced-noise reference image to provide a pre-processed image.

2. The method of claim 1, wherein iteratively denoising the reference image further comprises:
    identifying, with the at least one processor, bad pixels in the reference image; and
    replacing, with the at least one processor, the bad pixels in the reference image with median-filtered values.

3. The method of claim 2, wherein identifying bad pixels in the reference image and replacing bad pixels in the reference image with the median-filtered values includes iterating until a number of remaining bad pixels is within a tolerance value.

4. The method of claim 1, wherein iteratively denoising the scene image further comprises:
    identifying, with the at least one processor, bad pixels in the scene image; and
    replacing, with the at least one processor, the bad pixels in the scene image with median-filtered values.

5. The method of claim 4, wherein identifying bad pixels in the scene image and replacing bad pixels in the scene image with the median-filtered values includes iterating until a number of remaining bad pixels is within a tolerance value.

6. A method for estimating a point spread function (PSF) comprising:
    obtaining, with at least one processor, an edge intensity profile from at least one straight edge within an image;
    generating, with the at least one processor, at least one line spread function (LSF) via noise-regularized inversion of an integration operator operating on the edge intensity profile;
    building, with the at least one processor, leaky integration differentiation operators; and
    generating, with the at least one processor, the estimated PSF from the at least one LSF.

7. The method of claim 6, further comprising:
    setting, with the at least one processor, a regularization parameter.

8. The method of claim 6, further comprising:
    generating, with the at least one processor, a first noise value from portions of the edge intensity profile a distance from the at least one straight edge;
    generating, with the at least one processor, a second noise value from a difference between the edge intensity profile and an integral of the noise-regularized inversion of the integration operator operating on the edge intensity profile; and
    determining, with the at least one processor, a value of a local curvature regularization parameter resulting in the first noise value and the second noise value being within a tolerance range.

9. The method of claim 6, wherein the at least one straight edge contained within the image is slanted relative to a focal plane of an imaging system.

10. The method of claim 6, wherein the at least one straight edge contained within the image is transformed from at least one curved edge.

11. The method of claim 6, wherein the estimated PSF represents an estimated PSF of an imaging system.

12. The method of claim 6, wherein the estimated PSF represents an estimated PSF of an imaging system and a scattering medium.

13. The method of claim 6, further comprising:
    deblurring, with the at least one processor, the image based on the estimated PSF.

14. The method of claim 13, wherein deblurring the image based on the estimated PSF is accomplished by noise-regularized Fourier transform (FT) deblur processing.

15. The method of claim 13, wherein deblurring the image based on the estimated PSF is accomplished by noise-regularized Compressive Imaging (CI) deblur processing.

16. The method of claim 6, wherein generating the estimated PSF from the at least one LSF further comprises:
    fitting, with the at least one processor, a PSF model to the at least one LSF to generate the estimated PSF.

17. The method of claim 6, wherein generating the estimated PSF from the at least one LSF further comprises:
    taking, with the at least one processor, an outer product of the at least one LSF with the at least one LSF to generate the estimated PSF.

18. The method of claim 6, wherein generating the estimated PSF from the at least one LSF further comprises:
    rotating, with the at least one processor, the at least one LSF around a peak of the at least one LSF to generate the estimated PSF.

19. The method of claim 6, wherein the image is a long wavelength infrared (LWIR) image.

* * * * *